United States Patent
Suzuki

(10) Patent No.: US 10,637,798 B2
(45) Date of Patent: Apr. 28, 2020

(54) PACKET CONTROL METHOD AND PACKET CONTROL DEVICE

(71) Applicant: FUJITSU LIMITED, Kawasaki-shi, Kanagawa (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/161,148

(22) Filed: Oct. 16, 2018

(65) Prior Publication Data

US 2019/0132260 A1 May 2, 2019

(30) Foreign Application Priority Data

Oct. 26, 2017 (JP) .................................. 2017-207639

(51) Int. Cl.
| | |
|---|---|
| H04L 12/931 | (2013.01) |
| H04L 12/823 | (2013.01) |
| H04L 29/06 | (2006.01) |
| H04L 12/833 | (2013.01) |
| G06F 9/455 | (2018.01) |
| H04L 29/08 | (2006.01) |

(52) U.S. Cl.
CPC ............ H04L 49/208 (2013.01); H04L 47/31 (2013.01); H04L 47/32 (2013.01); H04L 69/22 (2013.01); G06F 9/45558 (2013.01); *G06F 2009/45595* (2013.01); *H04L 67/10* (2013.01)

(58) Field of Classification Search
CPC ....... H04L 49/208; H04L 47/31; H04L 47/32; H04L 69/22; H04L 67/10; G06F 9/45558; G06F 2009/45595
See application file for complete search history.

(56) References Cited

U.S. PATENT DOCUMENTS

| | | | | |
|---|---|---|---|---|
| 2012/0317566 | A1* | 12/2012 | Santos | G06F 9/45558 718/1 |
| 2015/0277959 | A1* | 10/2015 | Higuchi | G06F 9/45558 718/1 |
| 2018/0091387 | A1* | 3/2018 | Levi | H04L 43/028 |

FOREIGN PATENT DOCUMENTS

JP 2013-223191 10/2013

* cited by examiner

*Primary Examiner* — Duc C Ho

(74) *Attorney, Agent, or Firm* — Fujitsu Patent Center

(57) ABSTRACT

A packet control device includes a processor that receives a first packet to be input or output through a port. The processor determines whether the first packet is to be mirrored. The processor determines, upon determining that the first packet is to be mirrored, whether the first packet has been mirrored, based on a value of an area of the first packet. Upon determining that the first packet has not been mirrored, the processor generates a second packet by duplicating the first packet, sets a first value indicating completion of mirroring to the area of the second packet, transfers the second packet to a transfer destination, and transmits the first packet to a transmission destination. Upon determining that the first packet has been mirrored, the processor sets a second value indicating incompletion of mirroring to the area of the first packet, and transmits the first packet to the transmission destination.

9 Claims, 21 Drawing Sheets

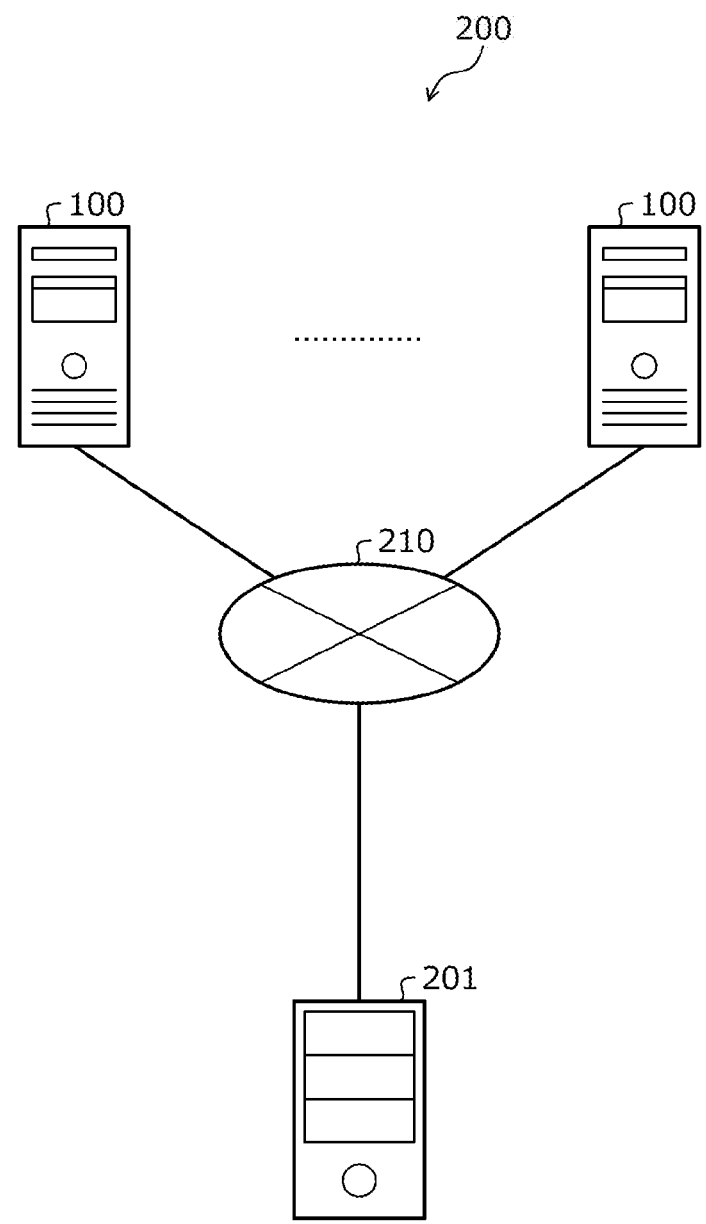

FIG. 4

| ID | NAME | MIRROR PORT ID | PORT MIRROR DIRECTION | MONITOR PORT ID |
|---|---|---|---|---|
| 1 | "Port1" | Port1 | BIDIRECTIONAL | Port2 |
| 2 | "Port2" | Port2 | OUTPUT | Port3 |
| 3 | "Port3" | Port3 | INPUT | Port4 |

| Port ID | Mirror Src | Mirror Dst |
|---------|------------|------------|
| Port1   | Yes        | No         |
| Port2   | No         | Yes        |
| Port3   | Yes        | Yes        |
| Port4   | No         | Yes        |

PACKET CONTROL METHOD AND PACKET CONTROL DEVICE

CROSS-REFERENCE TO RELATED APPLICATION

This application is based upon and claims the benefit of priority of the prior Japanese Patent Application 2017-207639, filed on Oct. 26, 2017, the entire contents of which are incorporated herein by reference.

FIELD

The embodiments discussed herein are related to a packet control method and a packet control device.

BACKGROUND

In the related art, there has been known a port mirroring technique for generating a mirror packet by duplicating a packet transmitted/received to/from a target VM (Virtual Machine) via a specific port of a virtual switch, and transferring the mirror packet to a monitor VM via another port.

As for the related art, for example, there is a technique in which, based on set control information, a packet that belongs to traffic to be collected is duplicated, modified to identify a flow for packet collection, and transferred to a predetermined traffic analysis device.

Related techniques are disclosed in, for example, Japanese Laid-open Patent Publication No. 2013-223191.

SUMMARY

According to an aspect of the present invention, provided is a packet control device including a memory and a processor coupled to the memory. The processor is configured to receive a first packet to be input or output through a first port which is any of plural ports. The processor is configured to refer to first information to determine whether the first packet is to be mirrored. The first information indicates whether a packet input or output through each of the plural ports is to be mirrored. The processor is configured to determine, when it is determined that the first packet is to be mirrored, whether the first packet has been mirrored, based on a value of a first predetermined area of the first packet. The processor is configured to generate, when it is determined that the first packet has not been mirrored, a second packet by duplicating the first packet. The processor is configured to set a first value to the first predetermined area of the second packet. The first value indicates that the second packet has been mirrored. The processor is configured to transfer the second packet to a transfer destination. The processor is configured to transmit the first packet to a transmission destination. The processor is configured to set, when it is determined that the first packet has been mirrored, a second value to the first predetermined area of the first packet. The second value indicates that the first packet has not been mirrored. The processor is configured to transmit the first packet having the second value in the first predetermined area to the transmission destination.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is an explanatory view illustrating an example of a port mirroring system;

FIG. 4 is an explanatory view illustrating an example of storage contents of a mirror port management table;

FIG. 5 is an explanatory view illustrating an example of storage contents of a port state management table;

DESCRIPTION OF EMBODIMENTS

In the related art, there is a case where a packet of the same contents is repeatedly duplicated and transferred to a monitor VM. For example, there is a case where when the virtual switch duplicates a packet addressed to a receiving VM1 and transfers the packet to a VM2, the transferred packet may be further duplicated and returned as a packet addressed to the VM1. In this case, the returned packet addressed to the VM1 is again duplicated and transferred to the VM2.

Hereinafter, embodiments will be described with reference to the drawings.

Figure 1A:
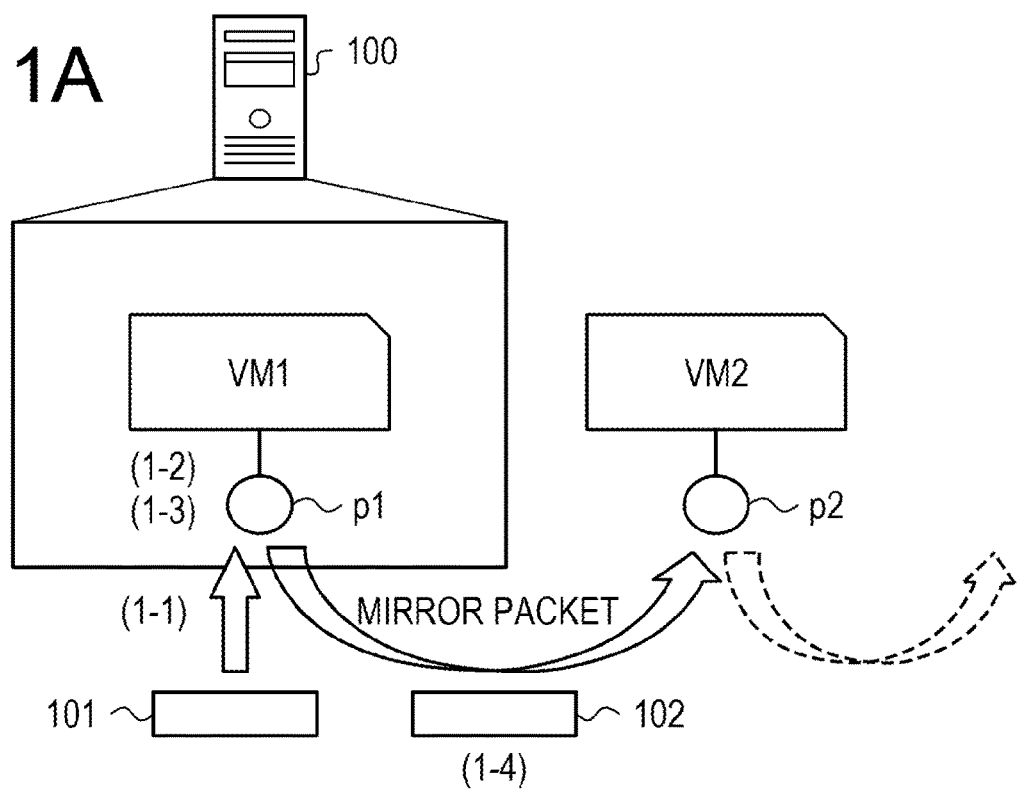
FIGS. 1A and 1B are explanatory views illustrating an example of a packet control method according to an embodiment.
Figure 1B:
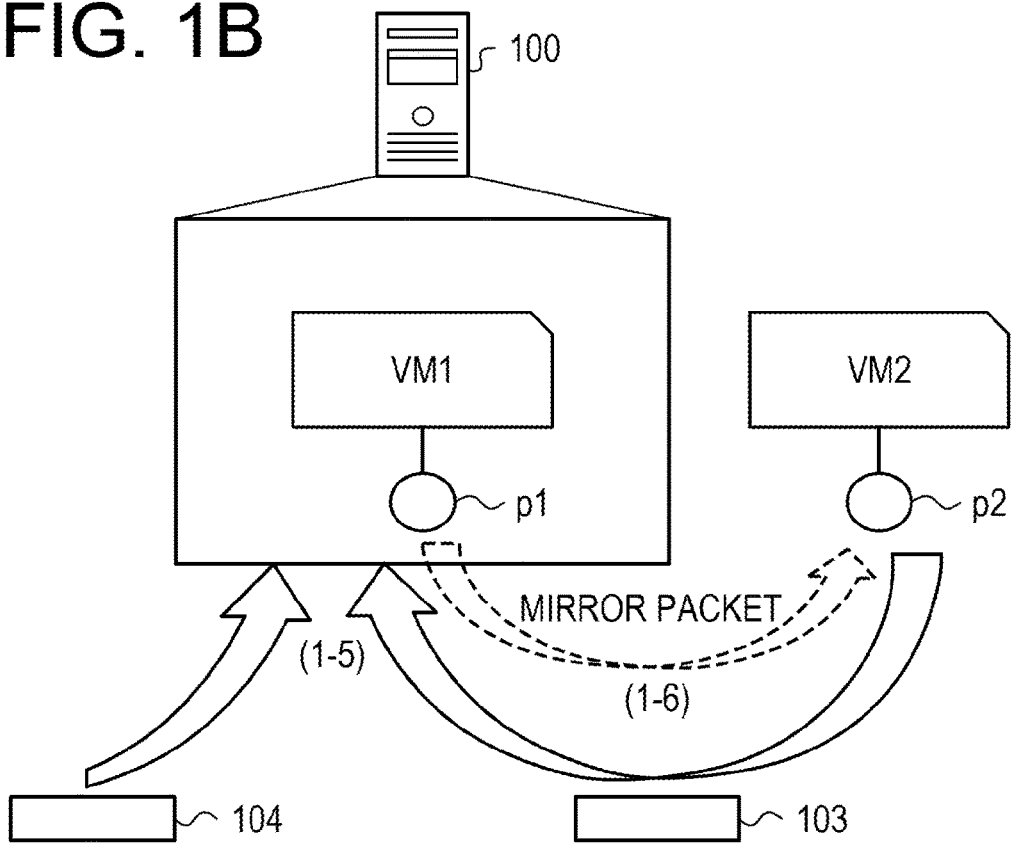

FIGS. 1A and 1B are explanatory views illustrating an example of a packet control method according to an embodiment. A packet control device 100 is a computer that operates a VM (Virtual Machine).

The VM operating in the packet control device 100 functions as a monitor VM in port mirroring or a target VM in port mirroring. The VM operating in the packet control device 100 may function as a monitor VM in port mirroring and may function as a target VM in port mirroring. In the following description, the port mirroring may be sometimes referred to as "mirroring".

The monitor VM is a VM that is the transfer destination of a mirror packet. The mirror packet is a packet obtained by duplicating a packet transmitted/received to/from the target VM. The monitor VM is a VM to which a mirror packet, which is obtained by duplicating a packet transmitted/received to/from the target VM, by, for example, mirroring, is transmitted.

The target VM is a VM connected to a port through which a packet as a target of generation of a mirror packet is input/output, and is a VM to/from which the packet as the target of generation of a mirror packet is transmitted/received. For example, the target VM is a VM to/from which a packet duplicated by mirroring, which is the target of generation of a mirror packet, is transmitted/received.

Here, the mirroring is implemented by, for example, a virtual switch of a computer that operates the target VM. For example, the virtual switch transfers a mirror packet, which is obtained by duplicating a packet transmitted/received through a port from the virtual switch to the target VM, via a port from the virtual switch to the monitor VM. The transfer is, for example, performed by the OpenFlow or by an encapsulation using an L3 packet.

However, the virtual switch may repeatedly duplicate a packet of the same contents and transfer the packet to the monitor VM. For example, a port through which a mirror packet flows in one mirroring and a port through which a packet to be duplicated flows in another mirroring may be the same so that plural mirroring may be set in a loop shape.

Specifically, there is a case where a first virtual switch having a port leading to a VM1 is set to duplicate a packet addressed to the VM1 and transfer the packet to a VM2, and a second virtual switch having a port leading to the VM2 is set to duplicate a packet addressed to the VM2 and transfer the packet to the VM1.

In this case, when the first virtual switch duplicates the packet addressed to VM1 and transfers the packet to the VM2, the second virtual switch duplicates the packet transferred from the first virtual switch and addressed to the VM2, and transfers the packet to the VM1. As a result, the first virtual switch receives a packet having the same content as the packet transferred to the VM2 as a packet addressed to the VM1. Here, since the first virtual switch cannot determine whether or not the received packet addressed to the VM1 is a duplicate of a packet transferred to the VM2 in the past, the first virtual switch again duplicates the received packet addressed to the VM1 and transfers the packet to the VM2. Similarly, the second virtual switch also receives a packet addressed to the VM 2, duplicates the received packet again, and transfers the packet to the VM1.

In this way, the first virtual switch and the second virtual switch repeatedly duplicate and transfer the packets having the same contents, and the packets having the same contents may continuously flow in the network in a loop shape. This may increase the amount of processing of the first virtual switch and the second virtual switch, which may result in an increase of communication traffic of the network.

Meanwhile, a case may be considered where, when a virtual switch receives a packet from a VM connected to its own switch, which is neither a source nor a transmission destination, the virtual switch determines that the received packet is a mirror packet, and may not mirror the received packet.

However, in this case as well, the virtual switch may repeatedly duplicate the packet of the same contents and transfer the packet to the monitor VM. For example, when a broadcast or multicast packet is received, the virtual switch cannot accurately determine whether or not the received packet is a mirror packet.

In addition, it may be conceived that the virtual switch prevents data from continuing to flow through an L2 network by STP (Spanning Tree Protocol). However, in the STP, since the setting of mirroring of the virtual switch is not changed, it cannot prevent the virtual switch from repeatedly duplicating and transferring a packet of the same contents.

Therefore, in the present embodiment, descriptions will be made on a packet control method for preventing port mirroring repetition by marking and transferring a mirror packet obtained by duplicating a marking target packet, and not duplicating when the marking target packet has been already marked.

In the example of FIGS. 1A and 1B, a packet input from the VM1 through a port p1 and a packet output to the VM1 are set to be transferred to the VM2. Meanwhile, a packet input from a VM2 through a port p2 and a packet output to the VM2 are set to be transferred to the VM1.

(1-1) The packet control device 100 receives a first packet input or output through any one of the ports. The first packet is, for example, a packet input from a VM through the port, or a packet output to the VM through the port. In the example of FIG. 1A, the packet control device 100 receives a packet 101 output to the VM1 through the port p1.

(1-2) The packet control device 100 refers to predetermined information to determine whether or not the accepted first packet is a mirroring target. The predetermined information is information indicating whether or not a packet input or output through a port is a mirroring target for each port. The predetermined information is implemented by, for example, a mirror port management table 400 which will be described later with reference to FIG. 4. In the example of FIG. 1A, the packet control device 100 determines that the packet 101 is the mirroring target.

(1-3) When it is determined that the first packet is the mirroring target, the packet control device 100 determines whether or not the first packet has been mirrored based on a value of a predetermined area of the first packet. The predetermined area is, for example, an Ethernet® header or an IP header. Specifically, the predetermined area is a VLAN Tag field or a TOS (Type of Service) field.

For example, when the value of the predetermined area is such a value that a checksum calculated based on the value of the predetermined area matches a checksum included in the first packet, the packet control device 100 determines that the first packet has been mirrored. Meanwhile, for example, when the value of the predetermined area is such a value that the checksum calculated based on the value of the predetermined area does not match the checksum included in the first packet, the packet control device 100 determines that the first packet has not been mirrored. In the example of FIG. 1A, the packet control device 100 determines that the packet 101 has not been mirrored.

(1-4) When it is determined that the first packet has not been mirrored, the packet control device 100 generates a second packet obtained by duplicating the first packet. The second packet is a mirror packet. Then, the packet control device 100 sets a value of a predetermined area of the second packet to a value indicating that mirroring has been completed, and transfers the value to a transfer destination. Further, the packet control device 100 transmits the first packet to a transmission destination. The transmission destination is, for example, a VM operating in the packet control device 100. The transmission destination may be, for example, a VM operating in a device different from the packet control device 100.

In the following description, setting to a value indicating that mirroring has been completed may be sometimes referred to as "marking". Further, in the following description, a value indicating that mirroring has been completed may be sometimes referred to as a "mirror mark".

In the example of FIG. 1A, since the packet control device 100 determines that the packet 101 has not been mirrored, the packet control device 100 generates a packet 102 obtained by duplicating the packet 101. Then, the packet control device 100 inverts a value of a predetermined area of the packet 102 such that a checksum calculated based on the value of the predetermined area does not match a checksum included in the packet 102, and transfers the packet 102 to the transfer destination. Further, the packet control device 100 transmits the packet 101 to the VM1 as the transmission destination through the port p1.

As a result, the packet control device 100 may make it possible for a computer having the port p2 to determine that the second packet has been mirrored when the computer receives the second packet output to the VM2 through the port p2. Further, when receiving the second packet output to the VM2 through the port p2, the computer having the port p2 may transfer a third packet obtained by duplicating the second packet to the VM1. Next, description will be given with reference to FIG. 1B.

(1-5) As in the first packet, the packet control device 100 receives a third packet or a fourth packet transmitted from an external computer. Each of the third packet and the fourth packet is a mirrored packet that has a value of a predetermined area indicating that mirroring has been completed. The third packet is, for example, a packet obtained by duplicating the second packet transferred by the packet control device 100. In the example of FIG. 1B, the packet control device 100 receives the packet 103 or 104.

As in the first packet, the packet control device 100 determines whether or not the third packet or the fourth packet is a mirroring target, and determines whether or the third packet or the fourth packet has already been mirrored. In the example of FIG. 1B, the packet control device 100 determines that the packet 103 or the packet 104 is a mirroring target, and determines that mirroring has been completed.

(1-6) When it is determined that the third packet or the fourth packet has already been mirrored, the packet control device 100 sets the value of the predetermined area of the third packet or the fourth packet to a value indicating that mirroring has not been completed, and transmits it to the transmission destination. In the example of FIG. 1B, the packet control device 100 inverts a value of a predetermined area of the packet 103 or the packet 104 and transmits the value to the VM1 as the transmission destination through the port p1. At this time, the packet control device 100 may not duplicate and transfer the packet 103 or 104.

Since the packet control device 100 does not duplicate and transfer the packet 103 with the same contents as the packet 101, the packet control device 100 may prevent a packet having the same contents from being repeatedly duplicated and transferred, and may prevent the packet of the same contents from continuously flowing in a loop shape. Further, the packet control device 100 may suppress the increase in processing amount, and thereby, suppressing the increase in communication amount of a network.

In addition, the packet control device 100 may provide a mirror mark even when transmitting a mirror packet obtained by duplicating a broadcast or multicast packet. The packet control device 100 may accurately determine that a received packet is a mirror packet even when receiving a mirror packet obtained by duplicating a broadcast or multicast packet. Therefore, the packet control device 100 may prevent a packet having the same contents from being repeatedly duplicated and transferred.

Here, the case where the transmission destination of a packet is a VM has been described, but the present disclosure is not limited thereto. For example, the transmission destination of the packet may be a physical machine. In addition, here, the case where a virtual switch receives a packet has been described, but the present disclosure is not limited thereto. For example, a physical switch may receive a packet. Further, here, the case where the packet control device 100 is a different computer from the computer having the port p2 has been described, but the present disclosure is not limited thereto. For example, the packet control device 100 may be a computer having the port p2.

Example of Port Mirroring System 200

Next, an example of the port mirroring system 200 to which the packet control device 100 illustrated in FIGS. 1A and 1B is applied will be described with reference to FIG. 2.

FIG. 2 is an explanatory view illustrating an example of the port mirroring system 200. In FIG. 2, the port mirroring system 200 includes plural packet control devices 100 and a management device 201.

In the port mirroring system 200, each packet control device 100 and the management device 201 are connected to each other via a wired or wireless network 210. The network 210 is, for example, a LAN (Local Area Network), a WAN (Wide Area Network), or the Internet.

The packet control device 100 is a computer that operates a VM, has a virtual switch, and implements a port mirroring. At the time of port mirroring, the packet control device 100 determines whether or not to mirror a packet. That is, the packet control device 100 either marks and mirrors the packet or does not mirror the packet. The packet control device 100 is, for example, a server. A virtual switch of each packet control device 100 is connected via, for example, a VLAN (Virtual Local Area Network). In the following description, when the respective packet control devices 100 are discriminated from each other, the devices may be collectively referred to as a "packet control device 100-$i$". Here, "$i$" is an integer from 1 to n. In addition, "n" is the number of packet control devices 100.

The management device 201 is a computer that executes a port mirror manager. The port mirror manager manages port mirroring by setting which of a packet input to a VM operating in the packet control device 100 and a packet output from the VM operating in the packet control device 100 is duplicated and transferred. The management device 201 is, for example, a server. Here, the case where the management device 201 is a device different from the packet control device 100 has been described, but the present disclosure is not limited thereto. For example, the management device 201 may be integrated with any one of the packet control devices 100.

Example of Hardware Configuration of Packet Control Device 100

Next, an example of a hardware configuration of the packet control device 100 will be described with reference to FIG. 3.

Figure 3:
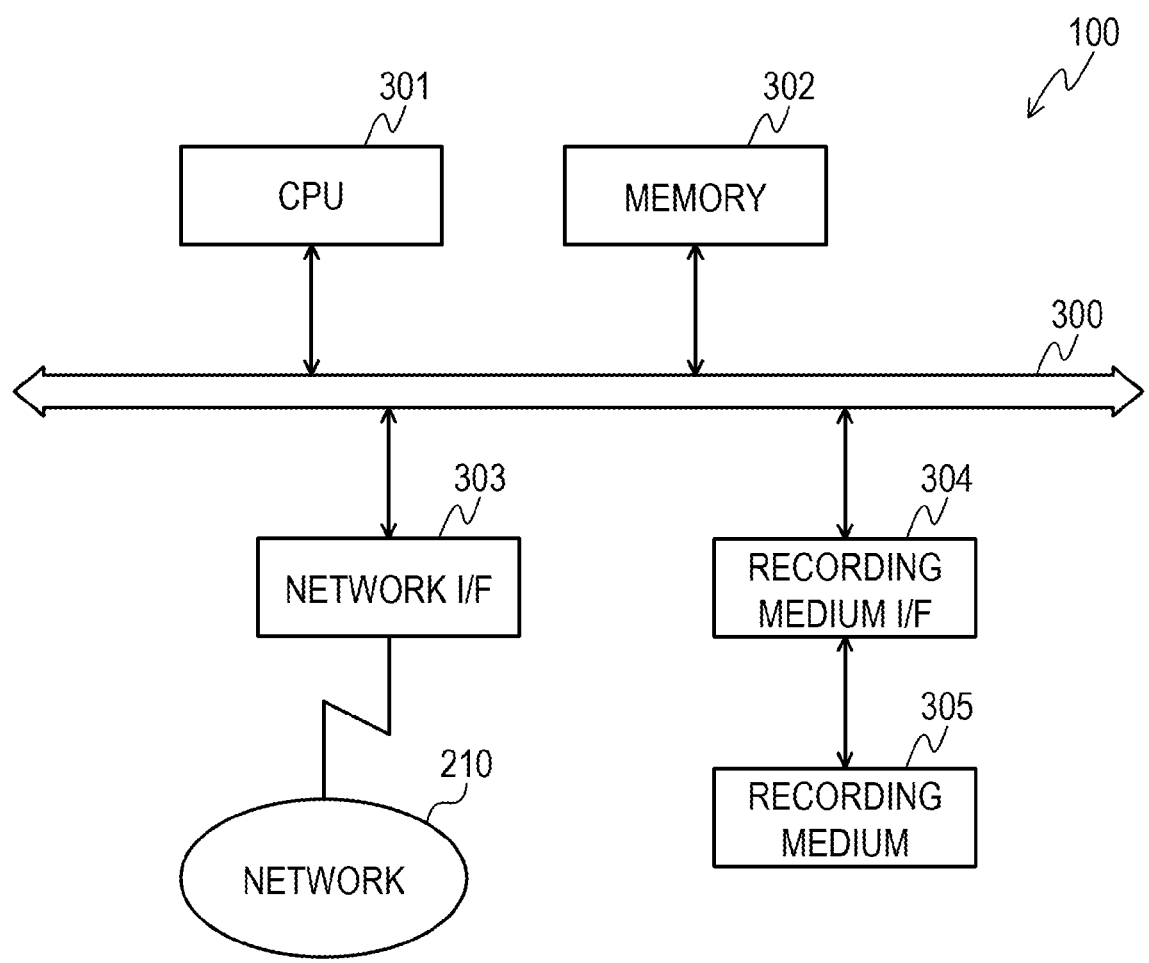
FIG. 3 is a block diagram illustrating a hardware configuration example of a packet control device.

FIG. 3 is a block diagram illustrating an example of a hardware configuration of the packet control device 100. In FIG. 3, the packet control device 100 includes a CPU (Central Processing Unit) 301, a memory 302, a network I/F (Interface) 303, a recording medium I/F 304, and a recording medium 305. These components are interconnected by a bus 300.

Here, the CPU 301 performs the overall control of the packet control device 100. The memory 302 includes, for example, a ROM (Read Only Memory), a RAM (Random Access Memory), and a flash ROM. Specifically, for example, the ROM or the flash ROM stores various programs, and the RAM is used as a work area of the CPU 301. The programs stored in the memory 302 are loaded into the CPU 301 to cause the CPU 301 to execute a coded process.

The network I/F 303 is connected to the network 210 via a communication line and connected to another computer via the network 210. The network I/F 303 serves as an interface between the network 210 and the interior of the packet control device 100, so as to control input/output of data from other computers. As the network I/F 303, for example, a modem or a LAN adapter may be adopted.

The recording medium I/F 304 controls read/write of data from/in the recording medium 305 under the control of the CPU 301. The recording medium I/F 304 is, for example, a disk drive, an SSD (Solid State Drive), or a USB (Universal Serial Bus) port. The recording medium 305 is a nonvolatile memory that stores data written under control of the recording medium I/F 304. The recording medium 305 is, for example, a disk, a semiconductor memory or a USB memory. The recording medium 305 may be removable from the packet control device 100.

In addition to the above-described components, the packet control device 100 may have, for example, a keyboard, a mouse, a display, a printer, a scanner, a microphone, and a speaker. Further, the packet control device 100 may have plural recording medium I/Fs 304 and plural recording media 305. Further, the packet control device 100 may not include the recording medium I/F 304 and the recording medium 305.

Example of Hardware Configuration of Management Device 201

Here, an example of the hardware configuration of the management device 201 is the same as the example of the hardware configuration of the packet control device 100 illustrated in FIG. 3, and therefore, explanation thereof will be omitted. Next, storage contents of various tables stored by the packet control device 100 and the management device 201 will be described.

Storage Contents of Mirror Port Management Table 400

Next, an example of storage contents of a mirror port management table 400 will be described with reference to FIG. 4. The mirror port management table 400 is implemented by, for example, a storage area of the management device 201.

FIG. 4 is an explanatory view illustrating an example of storage contents of the mirror port management table 400. As illustrated in FIG. 4, the mirror port management table 400 has fields of an ID, a name, a mirror port ID, a port mirror direction, and a monitor ID. In the mirror port management table 400, mirror port management information is stored as a record by setting information in each field for each mirror port through which a packet duplicated by port mirroring flows.

An ID allocated to the record is set in the ID field. The name of a port to be the mirror port through which the packet duplicated by port mirroring flows is set in the name field. An ID for identifying a mirror port is set in the mirror port ID field. State information indicating a direction in which a packet to be duplicated by a mirror port flows is set in the port mirror direction field. The state information "input" indicates a direction in which a packet is input from a virtual switch to a VM through a mirror port. The state information "output" indicates a direction in which a packet is output from the VM to the virtual switch through the mirror port. The state information "bidirectional" includes "input" and "output". An ID for identifying a monitor port leading to a monitor VM that receives a mirror packet is set in the monitor port ID field.

The mirror port management table 400 is generated and updated by the management device 201. By using the mirror port management table 400, the management device 201 can specify whether to generate a mirror packet by duplicating a packet flowing through which port to specify whether to transmit the mirror packet to which monitor VM. The mirror port management table 400 may be provided from the management device 201 to the packet control device 100.

Storage Contents of Port State Management Table 500

Next, storage contents of a port state management table 500 will be described with reference to FIG. 5. The port state management table 500 is implemented by, for example, a storage area of the memory 302 or the recording medium 305 of the mirror packet control device 100 illustrated in FIG. 3.

FIG. 5 is an explanatory view illustrating an example of storage contents of the port state management table 500. As illustrated in FIG. 5, the port state management table 500 has fields of a port ID, a mirror Src, and a mirror Dst. In the port state management table 500, port state management information is stored as a record information by setting information in each field for each mirror port through which a packet duplicated by port mirroring flows.

An ID for identifying a port is set in the port ID field. State information indicating whether or not a packet input to a VM through a port from a virtual switch is a mirroring target is set in the mirror Src field. The state information "Yes" indicates that the packet is a mirroring target. The state information "No" indicates that the packet is not a mirroring target. State information indicating whether or not the connection destination of a port is the transfer destination of a mirror packet is set in the mirror Dst field. The state information "Yes" indicates that the connection destination is the transfer destination of the mirror packet. The state information "No" indicates that the connection destination is not the transfer destination of the mirror packet.

The port state management table 500 is generated and updated by the packet control device 100. By using the port state management table 500, the packet control device 100 can specify the setting of port mirroring. Therefore, at the time of port mirroring, the packet control device 100 can determine whether or not to mark the mirror packet.

Example of Functional Configuration of Packet Control Device 100

Next, an example of a functional configuration of the packet control device 100 will be described with reference to FIG. 6.

Figure 6:
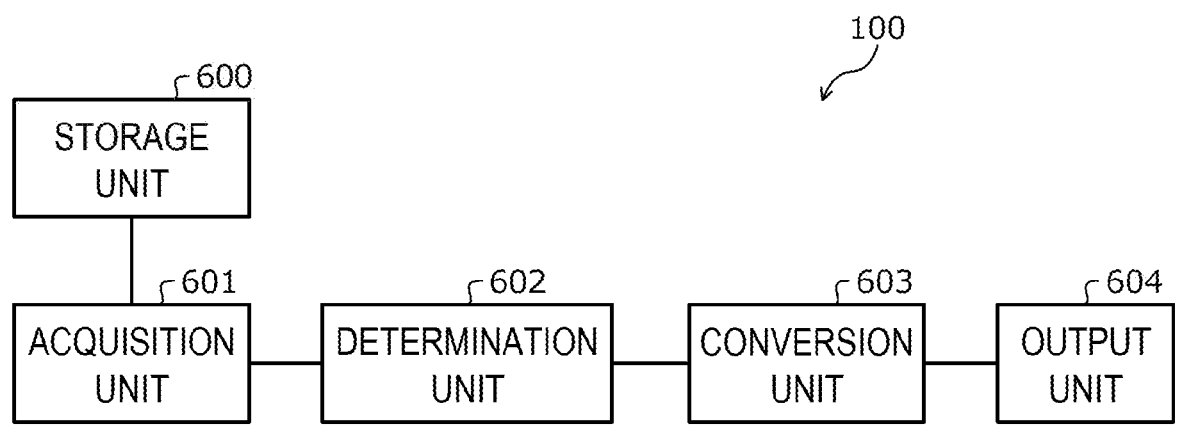
FIG. 6 is a block diagram illustrating an example of a functional configuration of the packet control device.

FIG. 6 is a block diagram illustrating an example of a functional configuration of the packet control device 100. The packet control device 100 includes a storage unit 600, an acquisition unit 601, a determination unit 602, a conversion unit 603, and an output unit 604.

The storage unit 600 is implemented by, for example, a storage area of the memory 302 or the recording medium 305 illustrated in FIG. 3. Hereinafter, a case where the storage unit 600 is included in the packet control device 100 will be described, but the present disclosure is not limited thereto. For example, the storage unit 600 may be included in a device different from the packet control device 100, and the storage contents of the storage unit 600 may be referred to from the packet control device 100.

The acquisition unit 601 to the output unit 604 are functions serving as a controller. Specifically, the functions of the acquisition unit 601 to the output unit 604 are implemented by causing the CPU 301 to execute a program stored in a storage area of the memory 302 or the recording medium 305 illustrated in FIG. 3, or by using the network I/F 303. The processing result of each functional unit is stored in the storage area of the memory 302 or the recording medium 305 illustrated in FIG. 3.

The storage unit 600 stores various information referred to or updated in processing of each functional unit. The storage unit 600 stores, for example, first information. The first information is information indicating whether or not a packet input or output through a port is a mirroring target for each port. The first information is implemented by, for example, the mirror port management table 400 illustrated in FIG. 4.

The storage unit 600 stores, for example, second information. The second information is information indicating whether or not a port is a port leading to a transfer destination of a mirror packet input through another port for each port. The second information is implemented by, for example, the port state management table 500 illustrated in FIG. 5. Thus, the storage unit 600 can make various kinds of information referred to by each functional unit.

The acquisition unit 601 acquires various kinds of information used for processing of each functional unit from the storage unit 600 and outputs the information to each functional unit. For example, the acquisition unit 601 may acquire various kinds of information used for the processing of each functional unit from the storage unit 600 and output it to each functional unit. For example, the acquisition unit 601 may acquire various kinds of information used for processing of each functional unit from a device different from the packet control device 100 and output the information to each functional unit. Specifically, the acquisition unit 601 receives, for example, the mirror port management table 400 illustrated in FIG. 4 or the port state management table 500 illustrated in FIG. 5 and stores the table in the storage unit 600.

Specifically, the acquisition unit 601 receives a first packet to be input or output through any port. The first packet input through the port is an output packet that is output from a VM and input to a virtual switch through a port of the virtual switch. The first packet output through the port is an input packet that is output from the virtual switch and input to the VM. The acquisition unit 601 receives an output packet that is output from the VM and is input to the virtual switch or an input packet that is output from the virtual switch and input to the VM through the port of the virtual switch.

The determination unit 602 refers to the first information to determine whether or not the received first packet is a mirroring target. For example, the determination unit 602 determines whether or not the received first packet is a mirroring target under the control of the management device 201 having the mirror port management table 400 illustrated in FIG. 4. For example, the determination unit 602 may receive the mirror port management table 400 illustrated in FIG. 4 from the management device 201 and may determine whether or not the received first packet is a mirroring target. As a result, the determination unit 602 may prevent a packet that is not a mirroring target from being mirrored.

When it is determined that the first packet is a mirroring target, the determination unit 602 determines whether or not the first packet has been mirrored based on a value of a predetermined area of the first packet. The predetermined area is included, for example, in an Ethernet header area. The predetermined area is included in, for example, an IP header area. The predetermined area may be divided into two or more areas. The predetermined area may be, for example, an Ethernet header area and an IP header area.

For example, the determination unit 602 determines whether or not a checksum calculated by inverting the value of the predetermined area of the first packet matches a checksum included in the first packet. When the checksums match each other, the determination unit 602 determines that the first packet has been mirrored. When the checksums do not match each other, the determination unit 602 determines that the first packet has not been mirrored, and returns the inverted value to the original value. As a result, when the received packet has already been mirrored, the determination unit 602 may prevent the received packet from being mirrored.

For example, the determination unit 603 may determine whether or not the checksum calculated by inverting a value of a first area of the first packet matches a first checksum. Further, the determination unit 603 may determine whether or not the checksum calculated by inverting a value of a second area of the first packet matches a second checksum. The first area is, for example, an IP header area. The first checksum is, for example, a value of a header checksum field of the IP header area. The second area is an Ethernet area. The second checksum is a frame check sequence (FCS).

Specifically, the determination unit 603 determines whether or not a checksum calculated by inverting a value of a first bit of a type of service (TOS) field of the IP header area of the first packet matches a value of a header checksum field of the IP header area. Furthermore, the determination unit 603 determines whether or not a checksum calculated by inverting a value of a first bit of a VLAN Tag field of the Ethernet area of the first packet matches a value of an FCS field.

Then, the determination unit 603 may determine whether or not the first packet has been mirrored, based on the determined results. For example, when one of the determination results indicates that the calculated checksum and the value of the FCS field do not match each other, the determination unit 603 determines that the first packet has been mirrored. Further, when all of the determination results indicate that the calculated checksum and the value of the FCS fields do not match each other, the determination unit 603 may determine that the first packet has been mirrored. As a result, the determination unit 603 may make it possible to distinguish between a case where there is an error in either the first area or the second area but no mirror mark is provided and a case where a mirror mark is provided. Further, the determination unit 603 may determine whether or not the first packet is broken based on the results of the determination. Further, the determination unit 603 may determine whether or not the first packet is a normal packet based on the determined results.

Further, the determination unit 602 may determine whether or not a packet output through the same port as the port through which the first packet passes is set as a mirroring target. Then, based on the determination result, the determination unit 602 may not determine whether or not the first packet has been mirrored.

For example, the determination unit 602 refers to the port state management table 500 illustrated in FIG. 5 to determine whether or not an input packet which is output from a virtual switch through the same port through which the first packet passes and is input to the VM is set as a mirroring target. When it is determined that the first packet is a mirroring target and determining that the packet output through the same port as the port through which the first packet passes is a mirroring target, the determination unit 602 determines whether or not mirroring has been completed.

Meanwhile, when the packet output through the same port as the port through which the first packet passes is not a mirroring target, the determination unit 602 does not determine whether or not the first packet has been mirrored. As a result, the determination unit 602 can reduce the amount of processing involved in the determination when a packet of the same contents does not flow in a loop shape without marking a mirror packet.

In addition, the determination unit 602 may refer to the second information to determine whether or not a port through which the first packet passes is a port leading to a transfer destination of a mirror packet input through another port. Then, based on the determination result, the determination unit 602 may not determine whether or not the first packet has been mirrored.

For example, the determination unit 602 may refer to the port state management table 500 illustrated in FIG. 5 to determine whether or not the port through which the first packet passes is a port leading to the transfer destination of the mirror packet input to a virtual switch through another port. When the first packet is a mirroring target and the port through which the first packet passes is a port leading to the transfer destination of the mirror packet input to the virtual switch through another port, the determination unit 602 determines whether or not the first packet has been mirrored.

Meanwhile, when the port through which the first packet passes is not a port leading to the transfer destination of the mirror packet input to the virtual switch through another port, the determination unit 602 does not determine whether or not the first packet has been mirrored. As a result, the determination unit 602 may reduce the amount of processing involved in the determination when a packet of the same contents does not flow in a loop shape without marking a mirror packet.

When it is determined that the first packet has not been mirrored, the conversion unit 603 generates a second packet obtained by duplicating the first packet. Then, the conversion unit 603 sets a value of a predetermined area of the second packet to a value indicating that mirroring has been completed. The conversion unit 603 controls the output unit 604 to transfer the second packet to the transfer destination and transmit the first packet to the transmission destination. The predetermined area is included, for example, in the Ethernet header area. The predetermined area is included, for example, in the IP header area.

For example, the conversion unit 603 inverts the value of the predetermined area of the second packet and sets the value of the predetermined area such that a checksum calculated based on the second packet does not match a checksum included in the second packet. As a result, the conversion unit 603 may mark the packet to make it possible to determine whether or not it is a mirror packet at the transfer destination of the mirror packet. Further, even when the mirror packet is further duplicated and returned, the conversion unit 603 may make it possible to determine whether or not it is a mirror packet.

When it is determined that the first packet has been mirrored, the conversion unit 603 sets the value of the predetermined area of the first packet to a value indicating that the first packet has not been mirrored. Then, the conversion unit 603 controls the output unit 604 to transmit the first packet to the transmission destination. For example, when the first packet is an output packet which is outputted from a VM through a port and input to a virtual switch, the transmission destination is another VM connected to the virtual switch or another VM operating on another computer. For example, when the first packet is an input packet that is output from a virtual switch and input to a VM, the transmission destination is a VM connected to the virtual switch.

For example, the conversion unit 603 controls the output unit 604 to transmit the first packet to another VM operating on another computer, which is a transmission destination, through a port different from the port through which the first packet is input to the virtual switch. Further, for example, the conversion unit 603 controls the output unit 604 to transmit the first packet to a VM operating on its own device through a port different from the port through which the first packet is input to the virtual switch. As a result, the conversion unit 603 may prevent a packet that has been mirrored from being repeatedly mirrored.

The output unit 604 transmits the first packet to the transmission destination or the second packet to the transfer destination under control of the conversion unit 603. The output unit 604 may output the processing result of each functional unit. The output format is, for example, display on a display, print-out to a printer, transmission to an external device by the network I/F 303, or storage in a storage area of the memory 302 or the recording medium 305. Thus, the output unit 604 can notify a user of the processing result of each functional unit to thereby support the management and operation of the mirror packet control device 100, for example, update of the setting values of the mirror packet control device 100. Therefore, the output unit 604 may improve the convenience of the mirror packet control device 100.

Example of Module Configuration of Port Mirroring System 200

Next, an example of a module configuration of the port mirroring system 200 for implementing the operation of each functional unit illustrated in FIG. 6 will be described with reference to FIG. 7.

Figure 7:
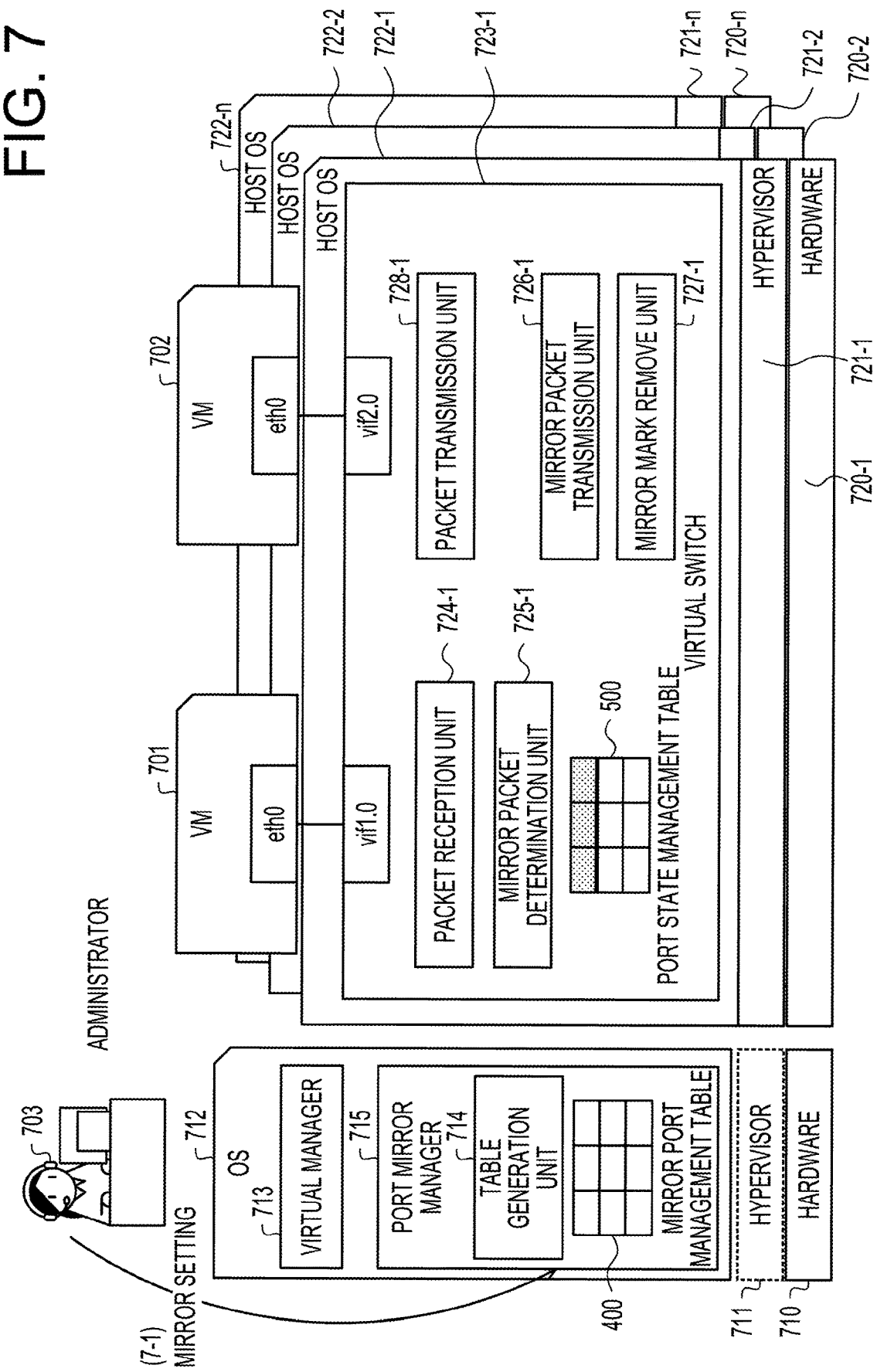
FIG. 7 is an explanatory view illustrating an example of a module configuration of the port mirroring system.

FIG. 7 is an explanatory view illustrating an example of a module configuration of the port mirroring system 200. In the following description, when port state management tables 500 of the respective mirror packet control devices 100-*i* are discriminated from each other, the tables may be collectively referred to as a "port state management table 500-*i*".

In the example of FIG. 7, in the hardware 710 of the management device 201, a hypervisor 711 of the management device 201 is being executed. In the hypervisor 711 of the management device 201, an OS 712 is being executed.

In the OS 712, a virtual manager 713 and a port mirror manager 715 are being executed. The port mirror manager 715 includes a table generation unit 714.

The virtual manager 713 controls a virtual environment. The port mirror manager 715 controls port mirroring. In FIG. 7, (7-1) the port mirror manager 715 receives the setting information for setting the port mirroring based on the operation input of an administrator 703 and reflects the setting information in the mirror port management table 400.

The table generation unit 714 refers to the mirror port management table 400 to generate the port state management table 500. The table generation unit 714 transmits the created port state management table 500 to the packet control device 100. Specifically, the table generation unit 714 executes a table generating process to be described later with reference to FIG. 17. The hypervisor 711 of the management device 201 may not be required. Here, an example of creating the port state management table 500 will be described below with reference to FIG. 8.

Figure 8:
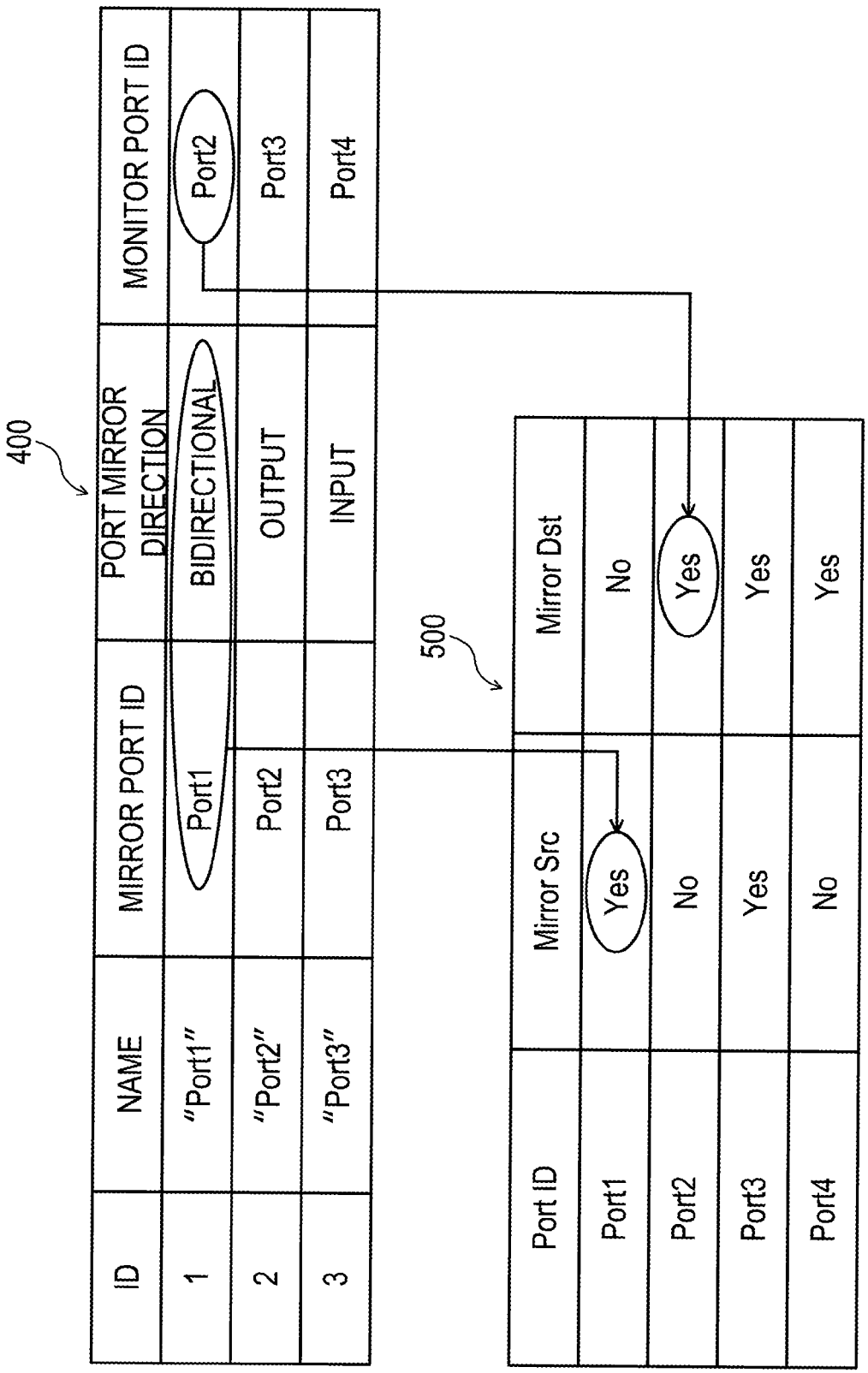
FIG. 8 is an explanatory view illustrating an example of generating the port state management table.

FIG. 8 is an explanatory view illustrating an example of generating the port state management table 500. In FIG. 8, the table generation unit 714 refers to a first record of the mirror port management table 400. Since a port mirror direction "bidirectional" is associated with a mirror port ID "Port1", the table generation unit 714 determines that an input packet at the mirror port of the mirror port ID "Port1" is a mirroring target. Therefore, the table generation unit 714 associates the mirror Src "Yes" with the port ID "Port 1" in the port state management table 500.

Further, since a monitor port ID "Port2" is associated with the mirror port ID "Port1", the table generation unit 714 determines that the transfer destination of a mirror packet is a connection destination of the mirror port of the monitor port ID "Port2". Therefore, the table generation unit 714 associates the mirror Dst "Yes" with the port ID "Port 2" in the port state management table 500.

Similarly, the table generation unit 714 refers to a second record of the mirror port management table 400. Since a port mirror direction "output" is associated with a mirror port ID "Port2", the table generation unit 714 determines that an input packet at the mirror port of the mirror port ID "Port2" is not a mirroring target. Therefore, the table generation unit 714 associates the mirror Src "No" with the port ID "Port 2" in the port state management table 500.

Further, since a monitor port ID "Port3" is associated with the mirror port ID "Port2", the table generation unit 714 determines that the transfer destination of a mirror packet is a connection destination of the mirror port of the monitor port ID "Port3". Therefore, the table generation unit 714 associates the mirror Dst "Yes" with the port ID "Port3" in the port state management table 500.

Similarly, the table generation unit 714 refers to a third record of the mirror port management table 400. Since a port mirror direction "input" is associated with a mirror port ID "Port3", the table generation unit 714 determines that an input packet at the mirror port of the mirror port ID "Port3" is a mirroring target. Therefore, the table generation unit 714 associates the mirror Src "Yes" with the port ID "Port 3" in the port state management table 500.

Further, since a monitor port ID "Port4" is associated with the mirror port ID "Port3", the table generation unit 714 determines that the transfer destination of a mirror packet is a connection destination of the mirror port of the monitor port ID "Port4". Therefore, the table generation unit 714 associates the mirror Dst "Yes" with the port ID "Port4" in the port state management table 500.

In addition, the table generation unit 714 sets "No" to a field in which "Yes" is not set. For example, the table generation unit 714 associates the mirror Dst "No" with the port ID "Port1" in the port state management table 500. Further, for example, the table generation unit 714 associates the mirror Src "No" with the port ID "Port4" in the port state management table 500.

Referring back to FIG. 7, in the hardware 720-*i* of the packet control device 100-*i*, a hypervisor 721-*i* of the packet control device 100-*i* is being executed. In the hypervisor 721-*i* of the packet control device 100-*i*, a host OS 722-*i* of the packet control device 100-*i* is being executed. In the host OS 722-*i* of the packet control device 100-*i*, a target VM 701 or a monitor VM 702 can be executed. In addition, there may be a case where either the target VM 701 or the monitor VM 702 does not exist. In addition, there may be a case where there are two or more target VMs 701 or there may be a case where there are two or more monitor VMs 702.

The host OS 722-*i* of the packet control device 100-*i* includes a virtual switch 723-*i*. The virtual switch 723-*i* includes a packet reception unit 724-*i*, a mirror packet determination unit 725-*i*, a mirror packet transmission unit 726-*i*, a mirror mark remove unit 727-*i* and a packet transmission unit 728-*i*. The virtual switch 723-*i* has a port state management table 500-*i*.

The packet reception unit 724-*i* receives a packet via a port. For example, the packet reception unit 724-*i* receives an output packet output from the target VM 701 to the virtual switch 723-*i* through a port. Further, the packet reception unit 724-*i* receives a packet addressed to the target VM 701 input from the virtual switch 723-*i* to the target VM 701 via the port from another port. Under the control of the port mirror manager 715, the packet reception unit 724-*i* determines whether or not the received packet is a mirroring target.

When the received packet is a mirroring target, the mirror packet determination unit 725-*i* refers to the port state management table 500 to determine whether or not it is possible to prevent a packet of the same contents from continuing to flow in a loop shape without marking a mirror packet. A state in which a packet of the same contents does not flow in a loop shape is, for example, a case where one of the mirror Dst and the mirror Src corresponding to a mirror port is "No". The state in which a packet of the same contents does not flow in a loop shape will be described later with reference to FIGS. 9 to 16.

For example, when the received packet is an output packet, the mirror packet determination unit 725-*i* acquires the mirror Dst and the mirror Src corresponding to a mirror port through which the received packet passes when being output from a VM. Then, when the acquired mirror Dst and mirror Src are "Yes", the mirror packet determination unit 725-*i* determines that there is a possibility that the packet of the same contents continues to flow in a loop shape. Meanwhile, when any one of the acquired mirror Dst and mirror Src is "No", the mirror packet determination unit 725-*i* determines that the packet of the same contents does not continue to flow in a loop shape.

For example, when the received packet is an input packet, the mirror packet determination unit 725-*i* acquires the mirror Dst and the mirror Src corresponding to a mirror port through which the received packet passes when being input to a VM. Then, when the acquired mirror Dst and mirror Src are "Yes", the mirror packet determination unit 725-*i* determines that there is a possibility that the packet of the same contents continues to flow in a loop shape. Meanwhile, when any one of the acquired mirror Dst and mirror Src is "No", the mirror packet determination unit 725-*i* determines that the packet of the same contents does not continue to flow in a loop shape.

Figure 9:
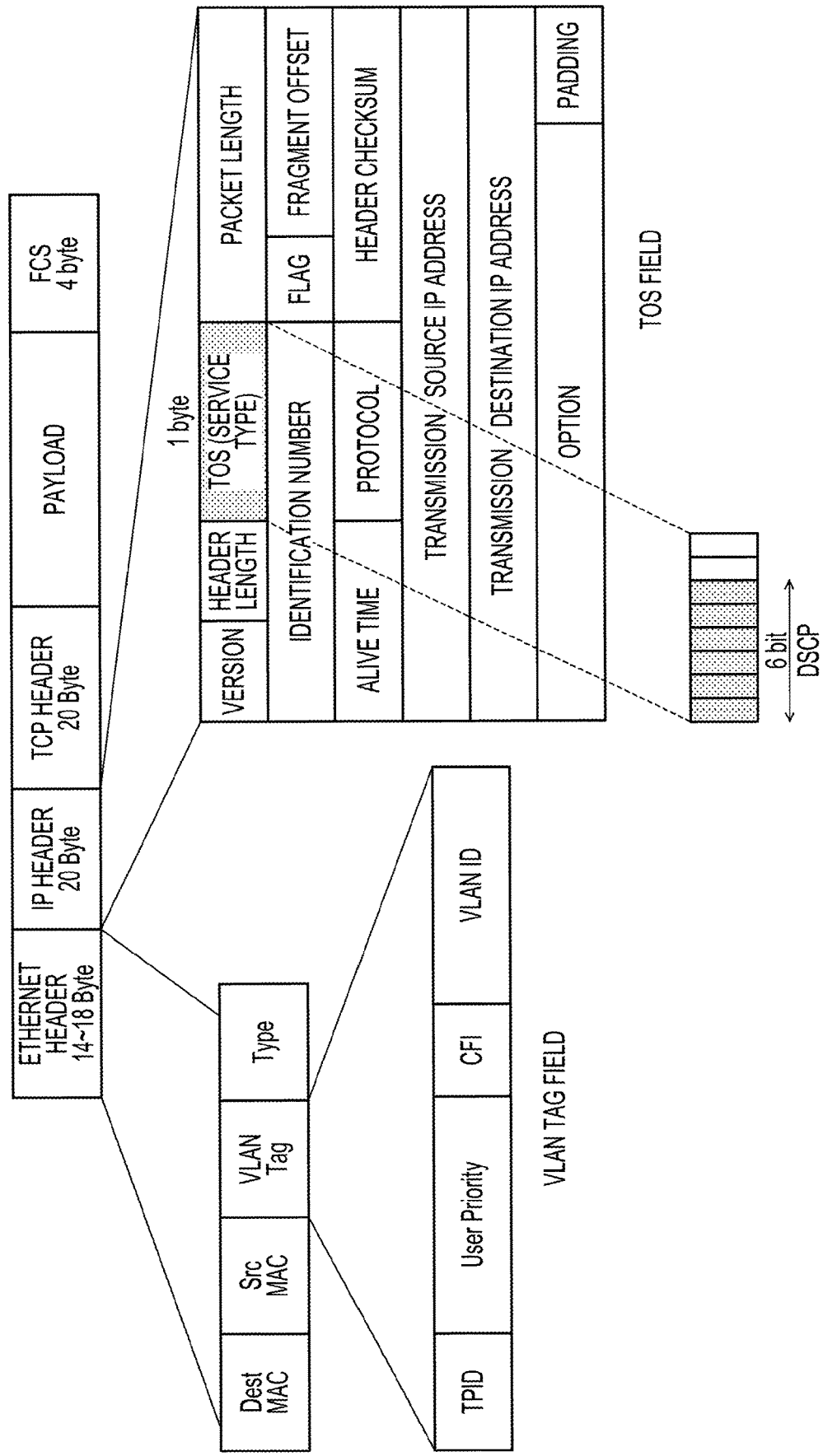
FIG. 9 is an explanatory view illustrating an example of determining whether or not mirroring has been completed.

When there is a possibility that the packet of the same contents continues to flow in a loop shape, the mirror packet determination unit 725-*i* determines whether or not the received packet has been mirrored, based on whether or not there is a mirror mark in a value of a predetermined area of the received packet. The predetermined area is included in, for example, the Ethernet header area. The predetermined area is included in, for example, the IP header area. Referring to FIG. 9, descriptions will be made on an example of the data structure of a packet and an example of determining whether or not mirroring has been completed.

FIG. 9 is an explanatory view illustrating an example of determining whether or not mirroring has been completed. As illustrated in FIG. 9, a packet 900 includes an Ethernet header, an IP header, a transmission control protocol (TCP) header, a payload, and an FCS. The Ethernet header includes fields such as a VLAN Tag. The IP header includes fields such as a TOS.

Here, for example, the head bits of the VLAN Tag field and the TOS field may be used as a predetermined area. Since a transmission source IP address and a transmission destination IP address are not used to transfer a mirror packet, for example, the head bits of a transmission source IP address field and a transmission destination IP address field may be used as the predetermined area. A mirror mark is, for example, a value obtained by inverting a value of the head bit of the TOS field. Specifically, the mirror mark is a value obtained by inverting the value of the head bit of the TOS field so that an IP checksum does not match a header checksum field of the IP header.

Further, for example, the mirror mark may be a value obtained by inverting a value of the head bit of the VLAN Tag field. Specifically, the mirror mark is a value obtained by inverting the value of the first bit of the VLAN Tag field so that an Ether checksum does not match the FCS. The predetermined area may be divided into two or more areas. The predetermined area may be 2 bits or more rather than 1 bit.

The mirror packet determination unit 725-*i* calculates the IP checksum of a received packet and compares the IP checksum with the header checksum field of the IP header. As a result of the comparison, when the IP checksum of the received packet does not match the IP checksum in the header checksum field of the IP header, the mirror packet determination unit 725-*i* determines that there is a mirror mark in the TOS field or that the received packet is broken.

Therefore, as the result of the comparison, when the IP checksum of the received packet does not match the IP checksum in the header checksum field of the IP header, the mirror packet determination unit 725-*i* inverts the value of the head bit of the TOS field, calculates again the IP checksum of the received packet, and compares the IP checksum with the header checksum field of the IP header. As a result of the comparison, when the IP checksum of the received packet does not match the IP checksum in the header checksum field of the IP header, the mirror packet determination unit 725-*i* determines that the received packet is broken. Meanwhile, as the result of the comparison, when the IP checksum of the received packet does not match the IP checksum in the header checksum field of the IP header, the mirror packet determination unit 725-*i* determines that there is a mirror mark in the TOS field and that the received packet has been mirrored.

In addition, the mirror packet determination unit 725-*i* calculates the IP checksum of the received packet and compares the IP checksum with the header checksum field of the IP header. As a result of the comparison, when the IP checksum of the received packet matches the IP checksum in the header checksum field of the IP header, the mirror packet determination unit 725-*i* further calculates the Ether checksum and compares the IP checksum with the FCS. As a result of the comparison, when the IP checksum of the received packet does not match the IP checksum in the header checksum field of the IP header, the mirror packet determination unit 725-*i* determines that there is a mirror mark in the VLAN Tag field or that the received packet is broken.

Therefore, as the result of the comparison, when the IP checksum of the received packet does not match the IP checksum in the header checksum field of the IP header, the mirror packet determination unit 725-*i* inverts the value of the head bit of the VLAN tag field, calculates again the Ether checksum of the received packet, and compares the Ether checksum with the FCS. As a result of comparison, when the IP checksum of the received packet does not match the IP checksum in the header checksum field of the IP header, the mirror packet determination unit 725-*i* determines that the received packet is broken. Meanwhile, as the result of the comparison, when the IP checksum of the received packet matches the IP checksum in the header checksum field of the IP header, the mirror packet determination unit 725-*i* determines that there is a mirror mark in the TOS field and that the received packet has been mirrored. In addition, the mirror packet determination unit 725-*i* calculates the Ether checksum and compares the Ether checksum with the FCS. As a result of the comparison, when the IP checksum of the received packet matches the IP checksum in the header checksum field of the IP header, the mirror packet determination unit 725-*i* determines that the received packet is a normal packet rather than a mirror packet.

Referring back to FIG. 7, when the received packet has not been mirrored, the mirror packet determination unit 725-*i* generates a mirror packet, marks the mirror packet, and controls the mirror packet transmission unit 726-*i* to transmit the mirror packet. The mirror packet determination unit 725-*i* marks the mirror packet by, for example, inverting the value of the head bit of the TOS field or the value of the head bit of the VLAN Tag field of the mirror packet. Further, the mirror packet determination unit 725-*i* controls the packet transmission unit 728-*i* to transmit a packet.

When the received packet has been mirrored, the mirror packet determination unit 725-*i* controls the mirror mark remove unit 727-*i* to remove the mirror mark from the packet and controls the packet transmission unit 728-*i* to transmit the packet. The mirror packet determination unit 725-*i* removes the mirror mark by, for example, inverting the value of the head bit of the TOS field of the mirror packet or the value of the head bit of the VLAN tag field of the mirror packet.

In addition, in a state where the packet of the same contents does not continue to flow in a loop shape, the mirror packet determination unit 725-*i* may not determine whether or not the received packet has been mirrored and may transfer the mirror packet without marking the mirror packet. The state where the packet of the same contents does not flow in a loop shape will be described later with reference to FIGS. 10 to 16.

The mirror packet transmission unit 726-*i* transmits a mirror packet under control of the mirror packet determination unit 725-*i*. The mirror mark remove unit 727-*i* removes the mirror mark under the control of the mirror packet determination unit 725-*i*. The packet transmission unit 728-*i* transmits the packet under the control of the mirror packet determination unit 725-*i*. Next, referring to FIGS. 10 to 16, descriptions will be made on how a mirror packet flows in the port mirroring system 200.

Example of Setting Port Mirroring

Next, an example of setting port mirroring will be described with reference to FIG. 10.

Figure 10:
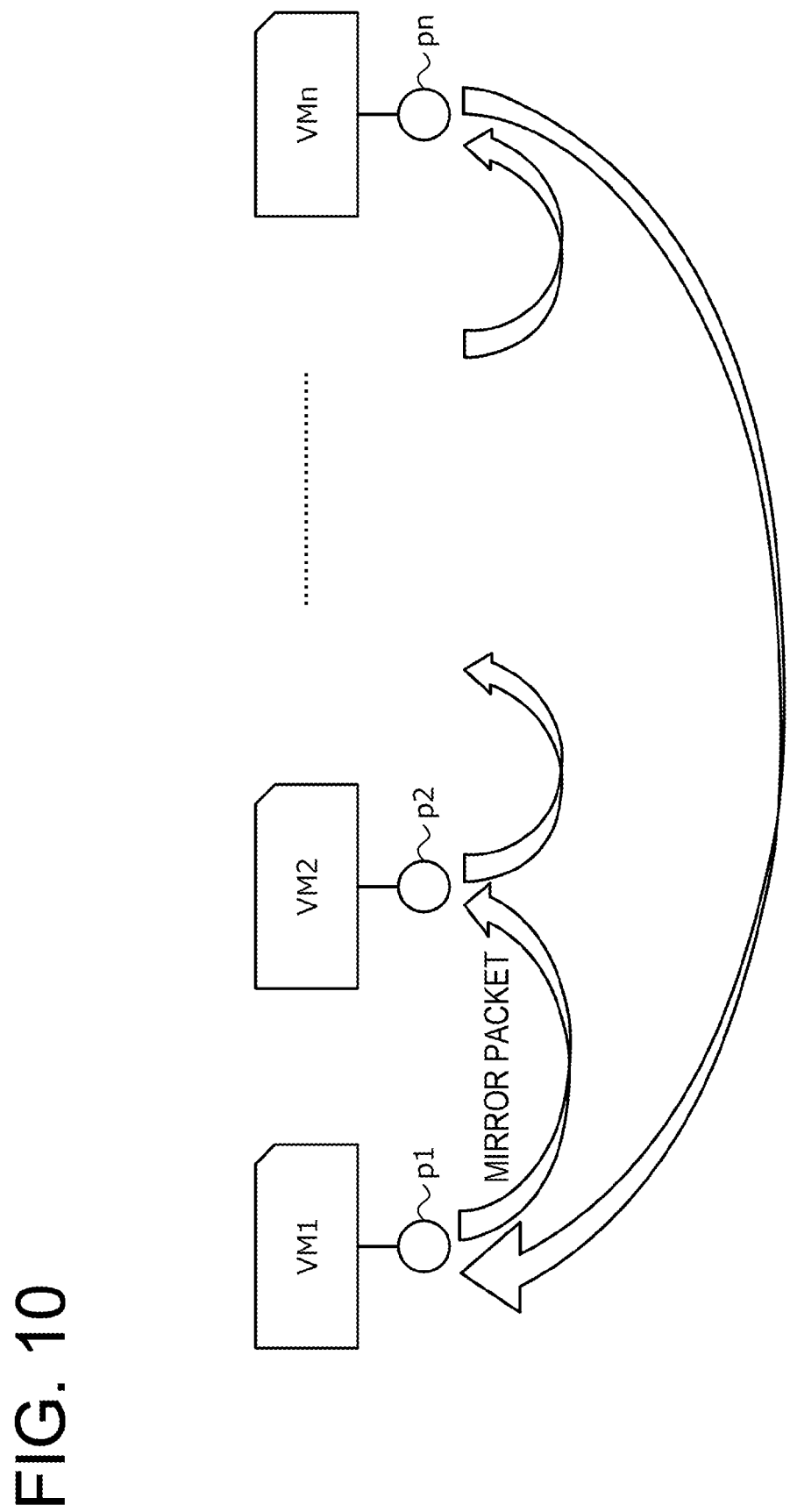
FIG. 10 is an explanatory view illustrating an example of setting port mirroring.

FIG. 10 is an explanatory view illustrating an example of setting port mirroring. In the example of FIG. 10, a VMi is operating on the packet control device 100-*i* and connected to a port pi of a virtual switch 723-*i* of the packet control device 100-*i*.

Meanwhile, for example, a port mirroring is set so that a packet flowing through the port pi to which the VMi is connected is duplicated and transferred to a VMi+1 through a port pi+1. Here, "i" is 1 to n−1. In addition, port mirroring is set so that a packet flowing through a port pn to which a VMn is connected is duplicated and transferred to the VM1 through the port p1.

In this way, a port mirroring may be set so that there is a possibility that a packet of the same contents continues to flow in a loop shape. In this case, a first operation example will be described with reference to FIGS. 11 and 12.

First Operation Example of Port Mirroring System 200

First, a first operation example of the port mirroring system 200 will be described with reference to FIGS. 11 and 12.

Figure 11:
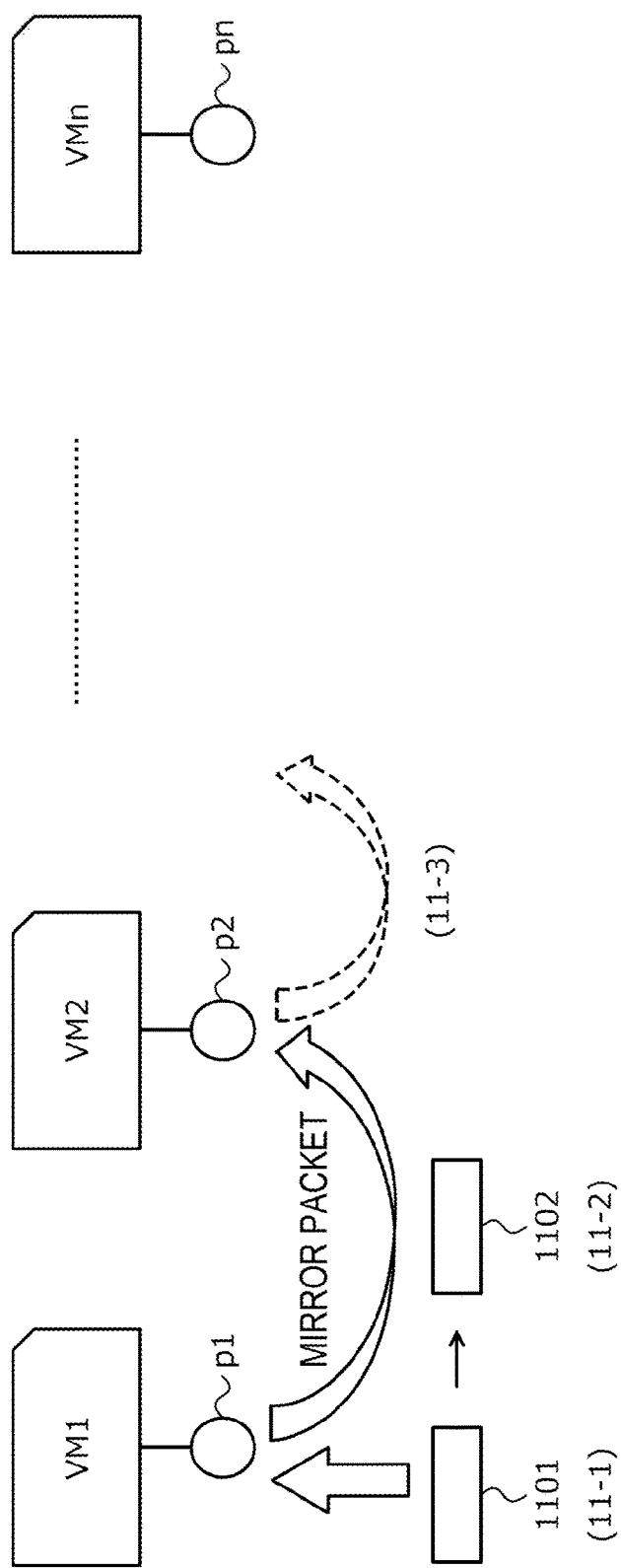
FIG. 11 is an explanatory view (part 1) illustrating a first operation example of the port mirroring system.
Figure 12:
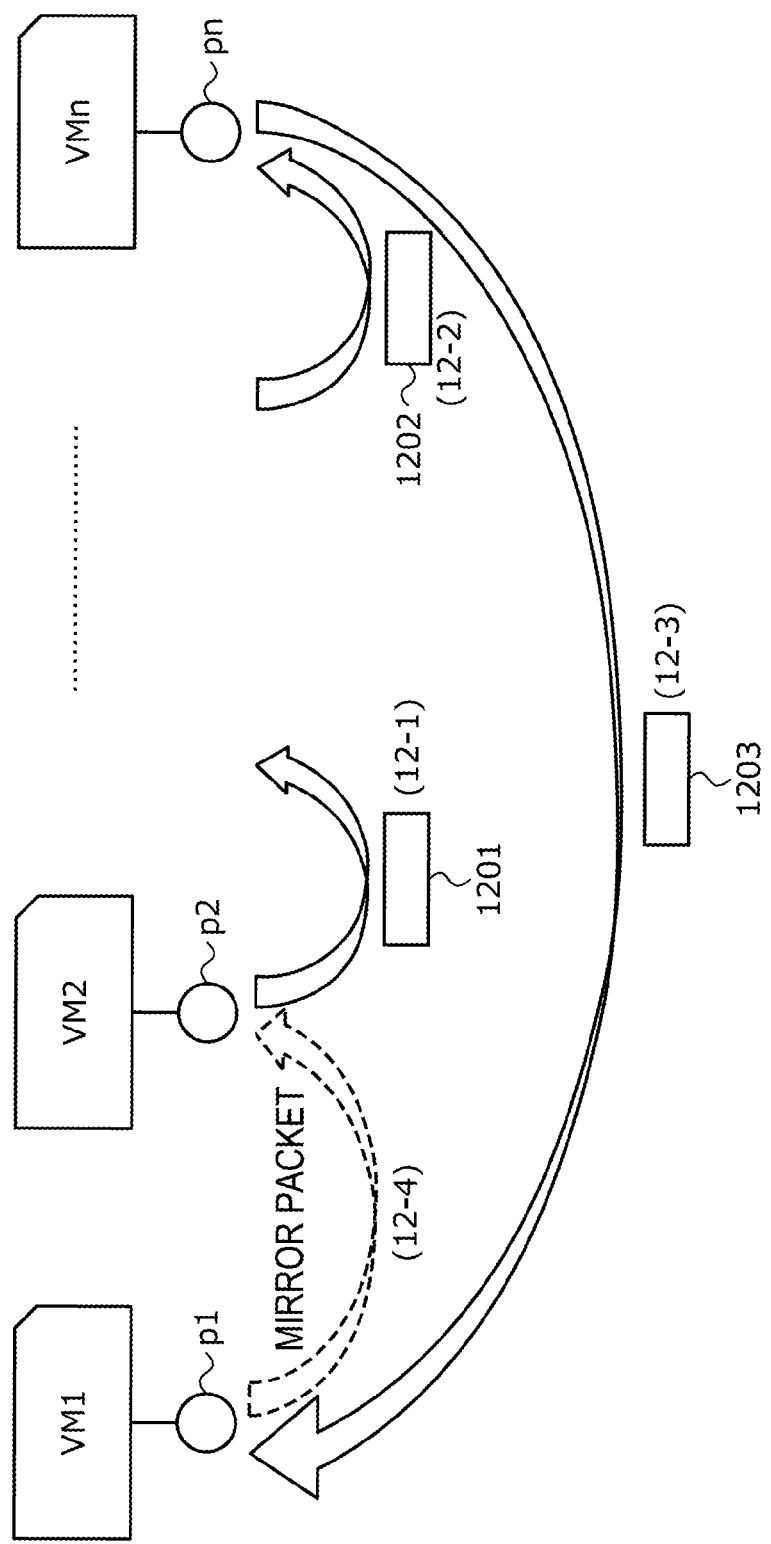
FIG. 12 is an explanatory view (part 2) illustrating the first operation example of the port mirroring system.

FIGS. 11 and 12 are explanatory views illustrating a first operation example of the port mirroring system 200. In the first operation example, the mirror Dst and the mirror Src corresponding to a port p1 in the port state management table 500 are "Yes".

In the example of FIG. 11, (11-1) the packet control device 100-1 receives a packet 1101 input to the VM1 through the port p1. Since the mirror Src and the mirror Dst corresponding to the port p1 are "Yes", the packet control device 100-1 determines that there is a possibility that a packet of the same contents continues to flow in a loop shape unless a mirror mark is attached.

(11-2) The packet control device 100-1 determines whether or not there is a mirror mark in the received packet 1101. When it is determined that there is no mirror mark in the received packet 1101, the packet control device 100-1 assigns a mirror mark to a mirror packet 1102 obtained by duplicating the received packet 1101 and transfers the mirror packet 1102 to the VM2.

(11-3) When it is determined that there is a mirror mark in the received packet 1102, the packet control device 100-2 does not duplicate the received packet 1102. Thus, the port mirroring system 200 may prevent the packet of the same contents from continuing to flow in a loop shape, thereby reducing the processing amount of the packet control device 100-*i*.

Here, there may be a case where the packet control device 100-2 duplicates and transfers the received packet 1102 without determining whether or not there is a mirror mark in the received packet 1102. Next, referring to FIG. 12, descriptions will be made on a case where the packet control device 100-2 duplicates and transfers the received packet 1102.

In the example of FIG. 12, (12-1) the packet control device 100-2 transfers a mirror packet 1201 obtained by duplicating the received packet 1102 to the VM3 (not illustrated).

(12-2) As a result of transferring the mirror packet 1201 obtained by duplicating the received packet 1102 to the VM3 (not illustrated), the packet control device 100-2 transfers a mirror packet 1202 having the same contents as the mirror packet 1201 to the VMn.

(12-3) The packet control device 100-n transfers a mirror packet 1203 obtained by duplicating the received packet 1202 to the VM1.

(12-4) The packet control device 100-1 receives the packet 1203 input to the VM1 through the port p1. Since the received packet 1203 has a mirror mark, the packet control device 100-1 does not duplicate the received packet 1203.

Thus, the port mirroring system 200 may prevent the packet of the same contents from continuing to flow in a loop shape, thereby reducing the processing amount of the packet control device 100-*i*. Further, the port mirroring system 200 may suppress performance deterioration of the port mirroring system 200.

Second Operation Example of Port Mirroring System 200

Next, a second operation example of the port mirroring system 200 will be described with reference to FIG. 13.

Figure 13:
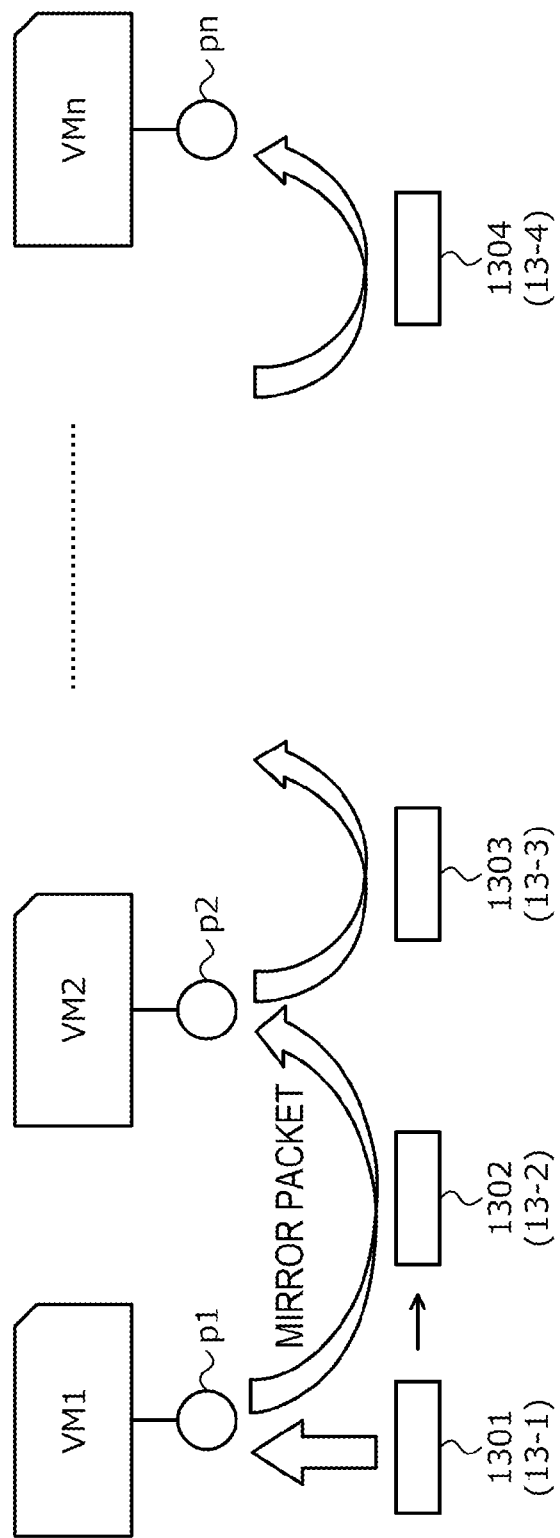
FIG. 13 is an explanatory view illustrating a second operation example of the port mirroring system.

FIG. 13 is an explanatory view illustrating a second operation example of the port mirroring system 200. The second operation example is an operation example in a case where port mirroring is set so as not to duplicate a packet flowing through the port pn, unlike in FIG. 10. Therefore, in the second operation example, the mirror Src corresponding to the port p1 in the port state management table 500 is "Yes", and the mirror Dst is "No".

In the example of FIG. 13, (13-1) the packet control device 100-1 receives a packet 1301 input to the VM1 through the port p1. Since the mirror Dst corresponding to the port p1 is "No", the packet control device 100-1 determines that the packet of the same contents does not continue to flow in a loop shape without attaching a mirror mark.

(13-2) The packet control device 100-1 transfers the received packet 1301 to the VM2 without confirming the mirror mark of the received packet 1301 and without giving a mirror mark to a mirror packet 1302 obtained by duplicating the received packet 1301.

(13-3) The packet control device 100-2 transfers a mirror packet 1303 obtained by duplicating the received packet 1302 to the VM3 (not illustrated).

(13-4) As a result of transferring the mirror packet 1303 obtained by duplicating the received packet 1302 to the VM3 (not illustrated), the packet control device 100-2 transfers a mirror packet 1304 having the same contents as the mirror packet 1302 to the VMn.

Here, since the packet control device 100-n does not duplicate and transfer the received packet 1304 to the VM1, the packet control device 100-1 does not receive the packet having the same content as the transferred packet 1301.

Thus, the port mirroring system 200 may prevent the packet of the same contents from continuing to flow in a loop shape, thereby reducing the processing amount of the packet control device 100-*i*. Further, the port mirroring system 200 may suppress performance deterioration of the port mirroring system 200.

Third Operation Example of Port Mirroring System 200

Next, a third operation example of the port mirroring system 200 will be described with reference to FIGS. 14 and 15.

Figure 14:
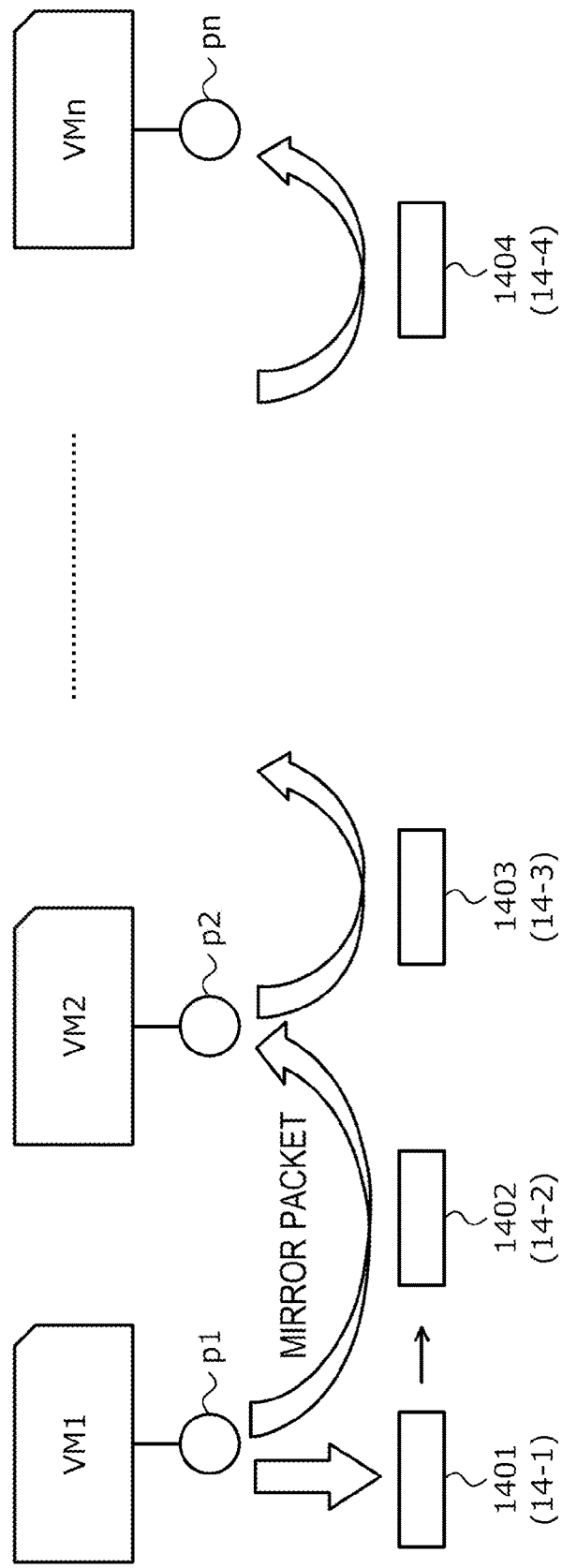
FIG. 14 is an explanatory view (part 1) illustrating a third operation example of the port mirroring system.
Figure 15:
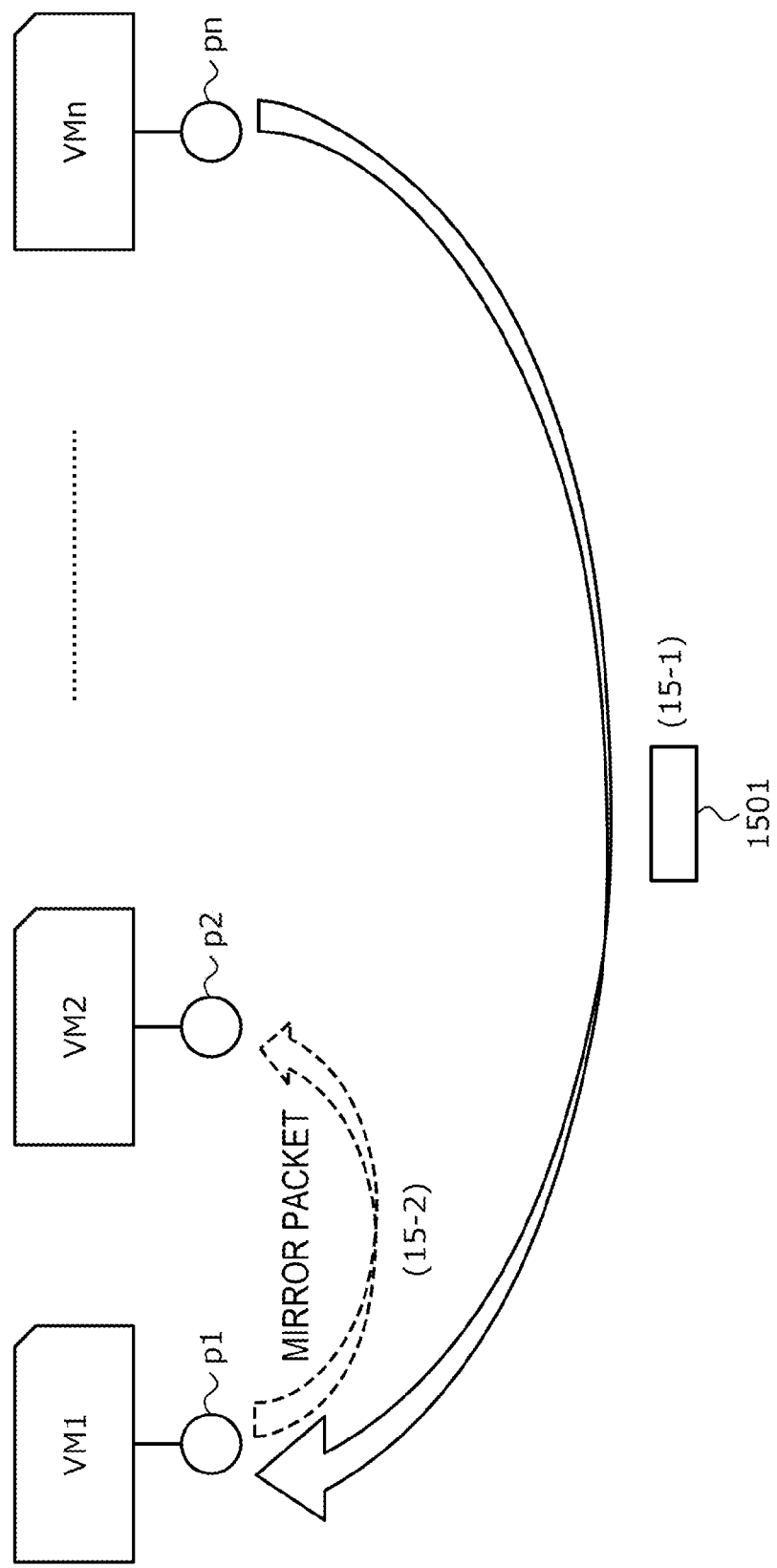
FIG. 15 is an explanatory view (part 2) illustrating a third operation example of the port mirroring system.

FIGS. 14 and FIG. 15 are explanatory views illustrating a third operation example of the port mirroring system 200. The third operation example is an operation example in a case where port mirroring is set so as to duplicate a packet output from the VM1 without duplicating a packet input to the VM1 through the port p1, among packets flowing through the port p1, unlike in FIG. 10. Therefore, in the third operation example, the mirror Src corresponding to the port p1 in the port state management table 500 is "No", and the mirror Dst is "Yes".

In the example of FIG. 14, (14-1) the packet control device 100-1 receives a packet 1401 output from the VM1 through the port p1. Since the mirror Src corresponding to the port p1 is "No", the packet control device 100-1 determines that the packet of the same contents does not continue to flow in a loop shape without attaching a mirror mark.

(14-2) The packet control device 100-1 transfers the received packet 1401 to the VM2 without confirming the mirror mark of the received packet 1401 and without giving a mirror mark to a mirror packet 1402 obtained by duplicating the received packet 1401.

(14-3) The packet control device 100-2 transfers a mirror packet 1403 obtained by duplicating the received packet 1402 to the VM3 (not illustrated).

(14-4) As a result of transferring the mirror packet 1403 obtained by duplicating the received packet 1402 to the VM3 (not illustrated), the packet control device 100-2 transfers a mirror packet 1404 having the same contents as the mirror packet 1402 to the VMn. Here, description will be given with reference to FIG. 15.

In the example of FIG. 15, (15-1) the packet control device 100-n transfers a mirror packet 1501 obtained by duplicating the received packet 1404 to the VM1.

(15-2) The packet control device 100-1 receives the packet 1501 input to the VM1 through the port p1. Since the received packet 1501 is not a mirroring target, the packet control device 100-1 does not duplicate the received packet 1501.

Thus, the port mirroring system 200 may prevent the packet of the same contents from continuing to flow in a loop shape, thereby reducing the processing amount of the packet control device 100-i. Further, the port mirroring system 200 may suppress the performance deterioration of the port mirroring system 200.

Fourth Operation Example of Port Mirroring System 200

Next, a fourth operation example of the port mirroring system 200 will be described with reference to FIG. 14.

Figure 16:
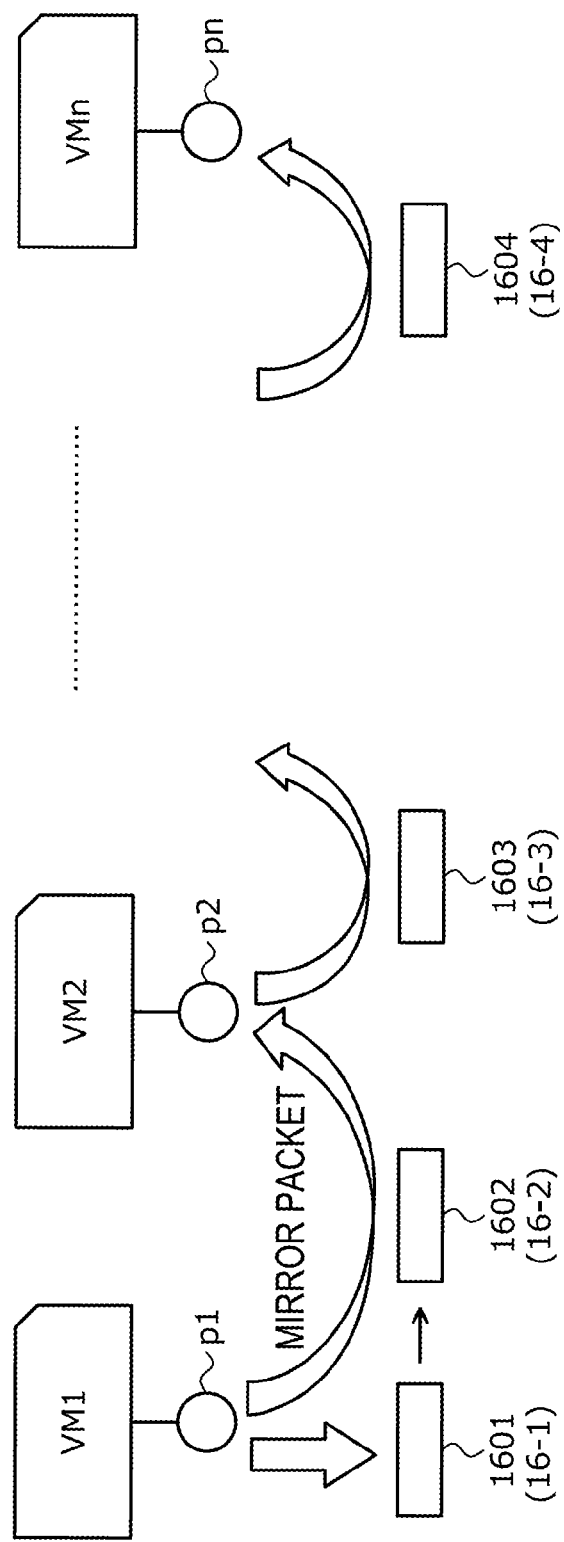
FIG. 16 is an explanatory view illustrating a fourth operation example of the port mirroring system.

FIG. 16 is an explanatory view illustrating a fourth operation example of the port mirroring system 200. The fourth operation example is an operation example in a case where port mirroring is set so as to duplicate a packet output from the VM1 without duplicating a packet input to the VM1 through the port p1, among packets flowing through the port p1, unlike in FIG. 10.

In addition, the fourth operation example is an operation example in a case where port mirroring is set so as not to duplicate a packet flowing through the port pn, unlike in FIG. 10. Therefore, in the fourth operation example, the mirror Src and the mirror Dst corresponding to the port p1 in the port state management table 500 is "No".

In the example of FIG. 16, (16-1) the packet control device 100-1 receives a packet 1601 input to the VM1 through the port p1. Since the mirror Src and the mirror Dst corresponding to the port p1 is "No", the packet control device 100-1 determines that the packet of the same contents does not continue to flow in a loop shape without attaching a mirror mark.

(16-2) The packet control device 100-1 transfers the received packet 1601 to the VM2 without confirming the mirror mark of the received packet 1601 and without giving a mirror mark to a mirror packet 1602 obtained by duplicating the received packet 1601.

(16-3) The packet control device 100-2 transfers a mirror packet 1603 obtained by duplicating the received packet 1602 to the VM3 (not illustrated).

(16-4) As a result of transferring the mirror packet 1603 obtained by duplicating the received packet 1602 to the VM3 (not illustrated), the packet control device 100-2 transfers a mirror packet 1604 having the same contents as the mirror packet 1602 to the VMn.

Here, since the packet control device 100-n does not duplicate and transfer the received packet 1604 to the VM1, the packet control device 100-1 does not receive the packet having the same content as the transferred packet 1601.

Thus, the port mirroring system 200 may prevent the packet of the same contents from continuing to flow in a loop shape, thereby reducing the processing amount of the packet control device 100-i. Further, the port mirroring system 200 may suppress performance deterioration of the port mirroring system 200.

Table Generation Procedure

Next, an example of a table generation procedure executed by the management device 201 will be described with reference to FIG. 17. The table generation procedure is implemented, for example, by the CPU of the management device 201, a storage area of the management device 201, and the I/F of the management device 201.

Figure 17:
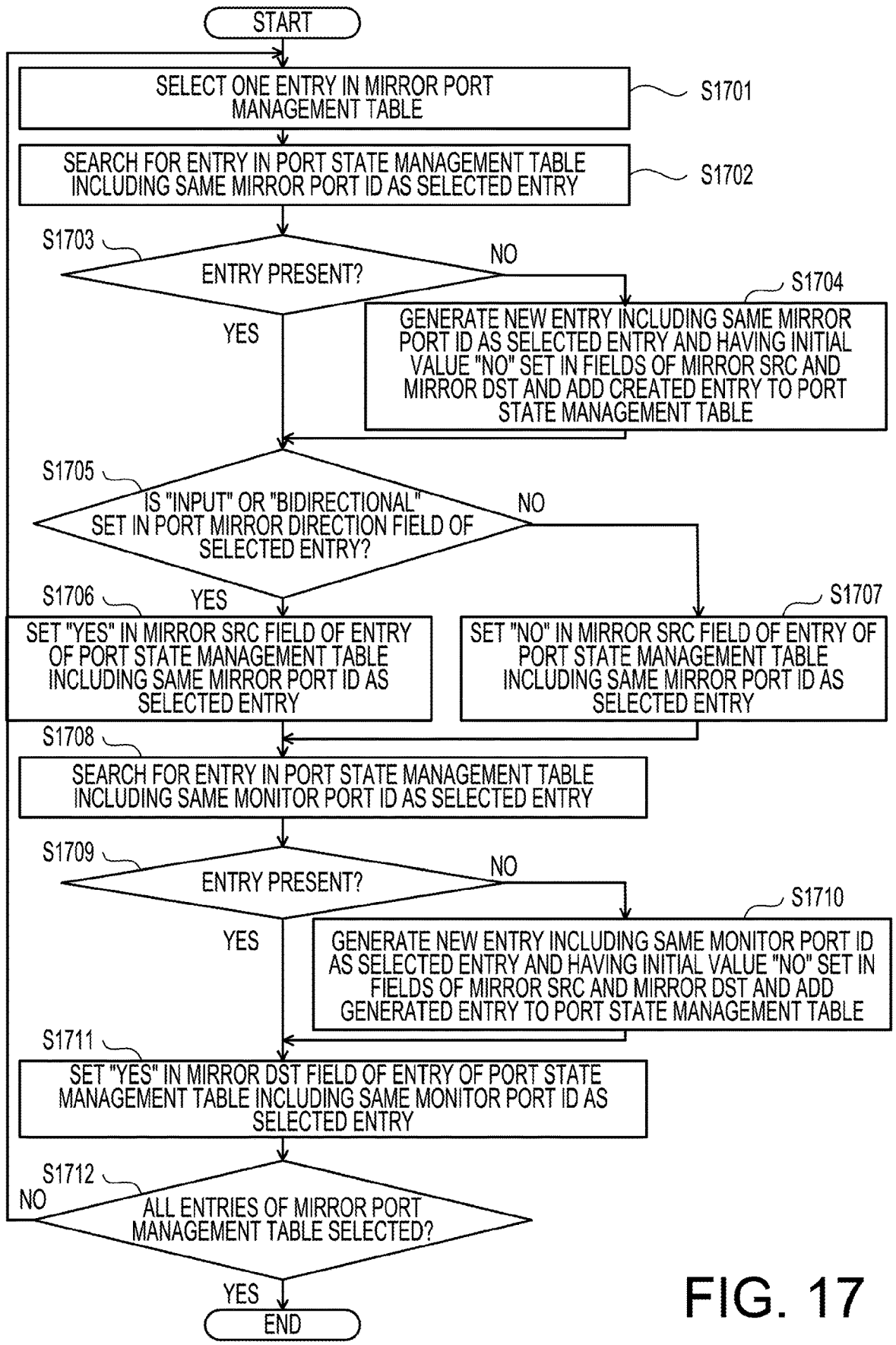
FIG. 17 is a flowchart illustrating an example of a table generation procedure.

FIG. 17 is a flowchart illustrating an example of the table generation procedure. In FIG. 17, the management device 201 selects any entry in the mirror port management table 400 (step S1701). Next, the management device 201 searches for entries in the port state management table 500 including the same mirror port ID as the selected entry (step S1702).

Then, the management device 201 determines whether or not there is an entry (step S1703). When it is determined that there is an entry ("Yes" in step S1703), the management device 201 proceeds to step S1705. Meanwhile, when it is determined that there is no entry ("No" in step S1703), the management device 201 proceeds step S1704.

In step S1704, the management device 201 generates a new entry including the same mirror port ID as the selected entry and having an initial value "No" set in the fields of mirror Src and mirror Dst. The management device 201 adds the generated entry to the port state management table 500 (step S1704). Then, the management device 201 proceeds to step S1705.

In step S1705, the management device 201 determines whether or not "input" or "bidirectional" is set in the port mirror direction field of the selected entry (step S1705). When it is determined that "input" or "bidirectional" is set ("Yes" in step S1705), the management device 201 proceeds to step S1706. Meanwhile, when it is determined that "output" is set ("No" in step S1705), the management device 201 proceeds to step S1707.

In step S1706, the management device 201 sets "Yes" in the mirror Src field of an entry of the port state management table 500 including the same mirror port ID as the selected entry (step S1706). Then, the management device 201 proceeds to step S1708.

In step S1707, the management device 201 sets "No" in the mirror Src field of an entry of the port state management table 500 including the same mirror port ID as the selected entry (step S1707). Then, the management device 201 proceeds to step S1708.

In step S1708, the management device 201 searches for entries in the port state management table 500 including the same monitor port ID as the selected entry (step S1708).

Then, the management device 201 determines whether or not there is an entry (step S1709). When it is determined that there is an entry ("Yes" in step S1709), the management device 201 proceeds to step S1711. Meanwhile, when it is determined that there is no entry ("No" in step S1709), the management device 201 proceeds to step S1710.

In step S1710, the management device 201 generates a new entry including the same monitor port ID as the selected entry and having an initial value "No" set in the fields of mirror Src and mirror Dst. The management device 201 adds the created entry to the port state management table 500 (step S1710). Then, the management device 201 proceeds to step S1711.

In step S1711, the management device 201 sets "Yes" in the mirror Dst field of an entry of the port state management table 500 including the same monitor port ID as the selected entry (step S 1711).

Next, the management device 201 determines whether or not all the entries in the mirror port management table 400 have been selected (step S1712). When it is determined that there is an unselected entry ("No" in step S1712), the management device 201 proceeds to step S1701. Meanwhile, when it is determined that all entries have been selected ("Yes" in step S1712), the management device 201 ends the table generating process.

Mirror Packet Determination Procedure

Next, an example of a mirror packet determination procedure executed by the packet control device 100 will be described with reference to FIG. 18. The mirror packet determination procedure is implemented by, for example, the CPU 301 illustrated in FIG. 3, a storage area of the memory 302 or the recording medium 305, and the network I/F 303.

Figure 18:
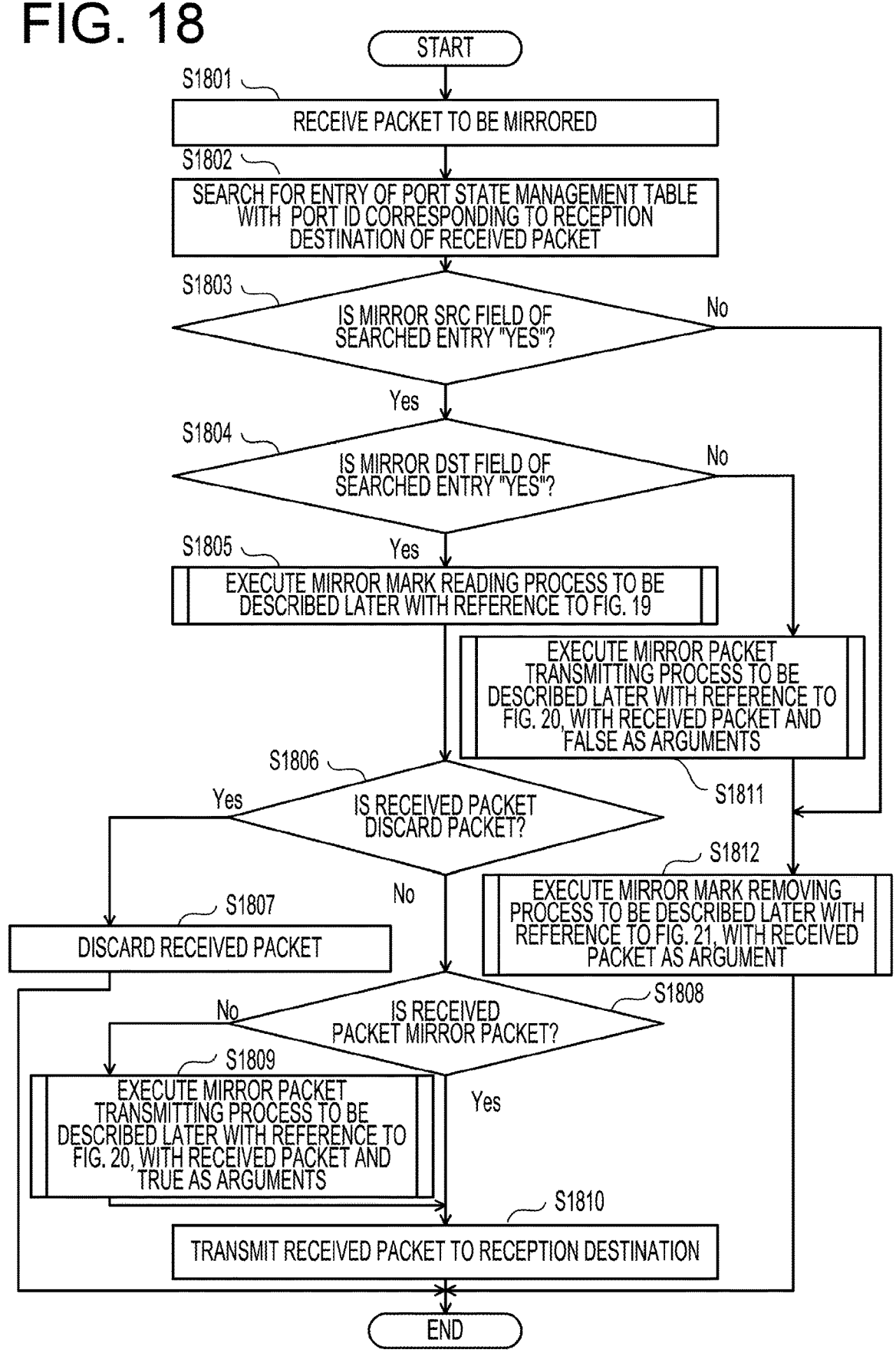
FIG. 18 is a flowchart illustrating an example of a mirror packet determination procedure.

FIG. 18 is a flowchart illustrating an example of the mirror packet determination procedure. In FIG. 18, the packet control device 100 receives a packet to be mirrored (step S1801). Next, the packet control device 100 searches for an entry of the port state management table 500 with a port ID corresponding to the transmission destination of the received packet (step S1802).

Then, the packet control device 100 determines whether or not the mirror Src field of the searched entry is "Yes" (step S1803). When it is determined that the Mirror Src field is "Yes" ("Yes" in step S1803), the packet control device 100 proceeds to step S1804. Meanwhile, when it is determined that the mirror Src field is not "Yes" ("No" in step S1803), the packet control device 100 proceeds step S1812.

In step S1804, the packet control device 100 determines whether or not the mirror Dst field of the searched entry is "Yes" (step S1804). When it is determined that the mirror Dst field is "Yes" ("Yes" in step S1804), the packet control device 100 proceeds to step S1805. Meanwhile, when it is determined that the mirror Dst field is not "Yes" ("No" in step S1804), the packet control device 100 proceeds to step S1811.

In step S1805, the packet control device 100 executes a mirror mark reading process to be described later with reference to FIG. 19 (step S1805).

Next, the packet control device 100 determines whether or not the received packet is a discard packet (step S1806). When it is determined that the received packet is a discard packet ("Yes" in step S1806), the packet control device 100 proceeds to step S1807. Meanwhile, when it is determined that the received packet is not a discard packet ("No" in step S1806), the packet control device 100 proceeds to step S1808.

In step S1807, the packet control device 100 discards the received packet (step S1807). Then, the packet control device 100 ends the mirror packet determining process.

In step S1808, the packet control device 100 determines whether or not the received packet is a mirror packet (step S1808). When it is determined that the received packet is a mirror packet ("Yes" in step S1808), the packet control device 100 proceeds to step S1810. Meanwhile, when it is determined that the received packet is not a mirror packet ("No" in step S1808), the packet control device 100 proceeds to step S1809.

In step S1809, the packet control device 100 executes a mirror packet transmitting process to be described later with reference to FIG. 20, with the received packet and True as arguments (step S1809). Then, the packet control device 100 proceeds to step S1810.

In step S1810, the packet control device 100 transmits the received packet to the transmission destination (step S1810). Then, the packet control device 100 ends the mirror packet determining process.

In step S1811, the packet control device 100 executes the mirror packet transmitting process to be described later with reference to FIG. 20, with the received packet and False as arguments (step S1811). Then, the packet control device 100 proceeds to step S1812.

In step S1812, the packet control device 100 executes a mirror mark removing process to be described later with reference to FIG. 21, with the received packet as an argument (step S1812). Then, the packet control device 100 ends the mirror packet determining process.

Mirror Mark Reading Procedure

Next, an example of the mirror mark reading procedure executed by the packet control device 100 will be described with reference to FIG. 19. The mirror mark reading procedure is implemented by, for example, the CPU 301 illustrated in FIG. 3, a storage area of the memory 302 or the recording medium 305, and the network I/F 303.

Figure 19:
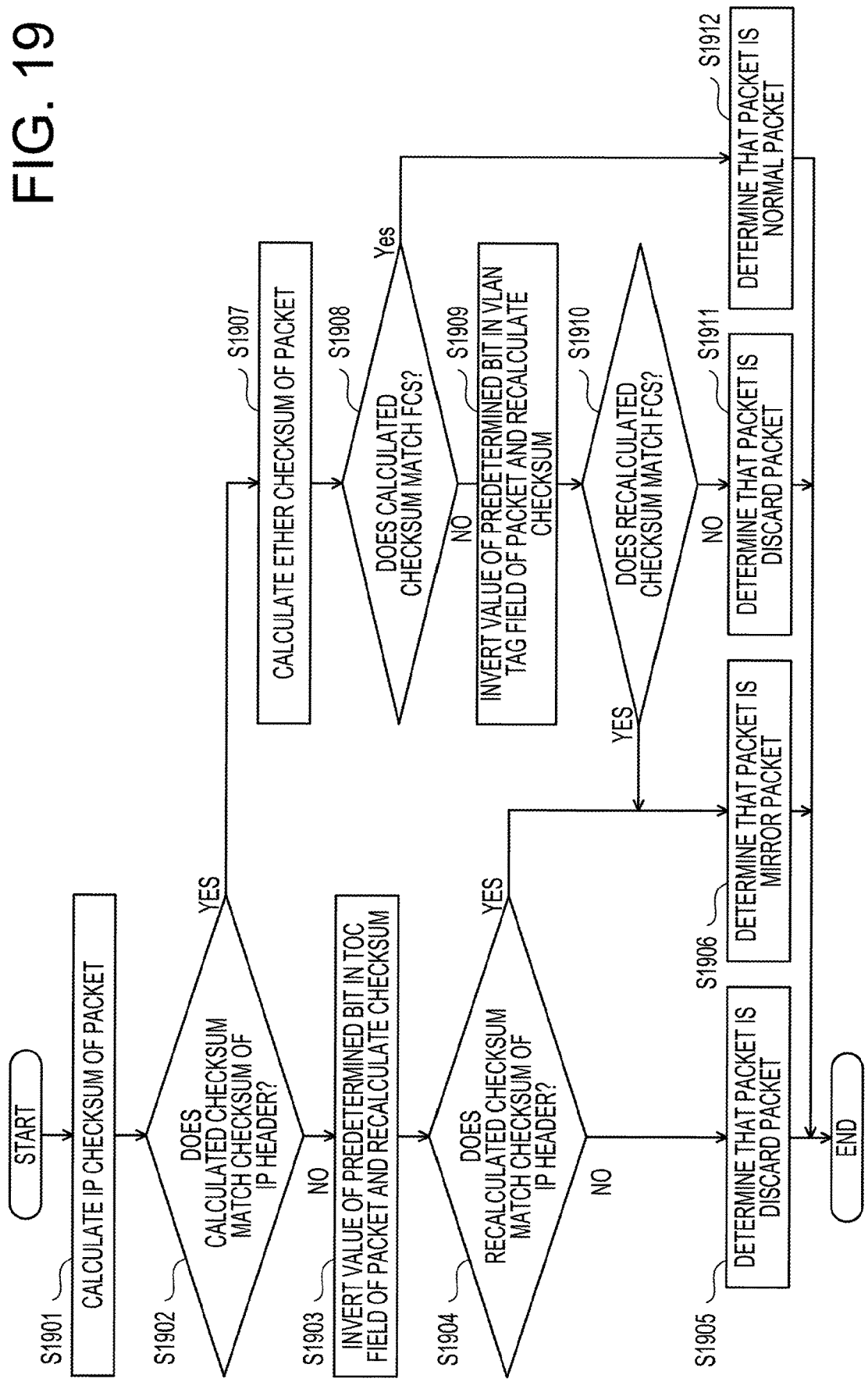
FIG. 19 is a flowchart illustrating an example of a mirror mark reading procedure.

FIG. 19 is a flowchart illustrating an example of the mirror mark reading procedure. In FIG. 19, the packet control device 100 calculates the IP checksum of a packet (step S1901).

Next, the packet control device 100 determines whether or not the calculated checksum matches the checksum of the IP header (step S1902).

When it is determined that the calculated checksum does not match the checksum of the IP header ("No" in step S1902), the packet control device 100 proceeds to step S1903. Meanwhile, when it is determined that the calculated checksum matches the checksum of the IP header ("Yes" in step S1902), the packet control device 100 proceeds to step S1907.

In step S1903, the packet control device 100 inverts a value of a predetermined bit in the TOS field of the packet and recalculates a checksum (step S1903).

Next, the packet control device 100 determines whether or not the recalculated checksum matches the checksum of the IP header (step S1904). When it is determined that the recalculated checksum matches the checksum of the IP header ("Yes" in step S1904), the packet control device 100 proceeds to step S1906. Meanwhile, when it is determined that the recalculated checksum does not match the checksum of the IP header ("No" in step S1904), the packet control device 100 proceeds to step S1905.

In step S1905, the packet control device 100 determines that the packet is a discard packet (step S1905). Then, the packet control device 100 ends the mirror mark reading process.

In step S1906, the packet control device 100 determines that the packet is a mirror packet (step S1906). Then, the packet control device 100 ends the mirror mark reading process.

In step S1907, the packet control device 100 calculates the Ether checksum of the packet (step S1907).

Next, the packet control device 100 determines whether or not the calculated checksum matches the FCS (step S1908). When it is determined that the calculated checksum matches the FCS ("Yes" in step S1908), the packet control device 100 proceeds to step S1912. Meanwhile, when it is determined that the calculated checksum does not match the FCS ("No" in step S1908), the packet control device 100 proceeds to step S1909.

In step S1909, the packet control device 100 inverts a value of a predetermined bit in the VLAN Tag field of the packet and recalculates a checksum (step S1909).

Next, the packet control device 100 determines whether or not the recalculated checksum matches the FCS (step S1910). When it is determined that the recalculated checksum matches the FCS ("Yes" in step S1910), the packet control device 100 proceeds to step S1906. Meanwhile, when it is determined that the recalculated checksum does not match the FCS ("No" in step S1910), the packet control device 100 proceeds to step S1911.

In step S1911, the packet control device 100 determines that the packet is a discard packet (step S1911). Then, the packet control device 100 ends the mirror mark reading process.

In step S1912, the packet control device 100 determines that the packet is a normal packet (step S1912). Then, the packet control device 100 ends the mirror mark reading process.

Mirror Packet Transmission Procedure

Next, an example of the mirror packet transmission procedure executed by the packet control device 100 will be described with reference to FIG. 20. The mirror packet transmission procedure is implemented by, for example, the CPU 301 illustrated in FIG. 3, a storage area of the memory 302 or the recording medium 305, and the network I/F 303.

Figure 20:
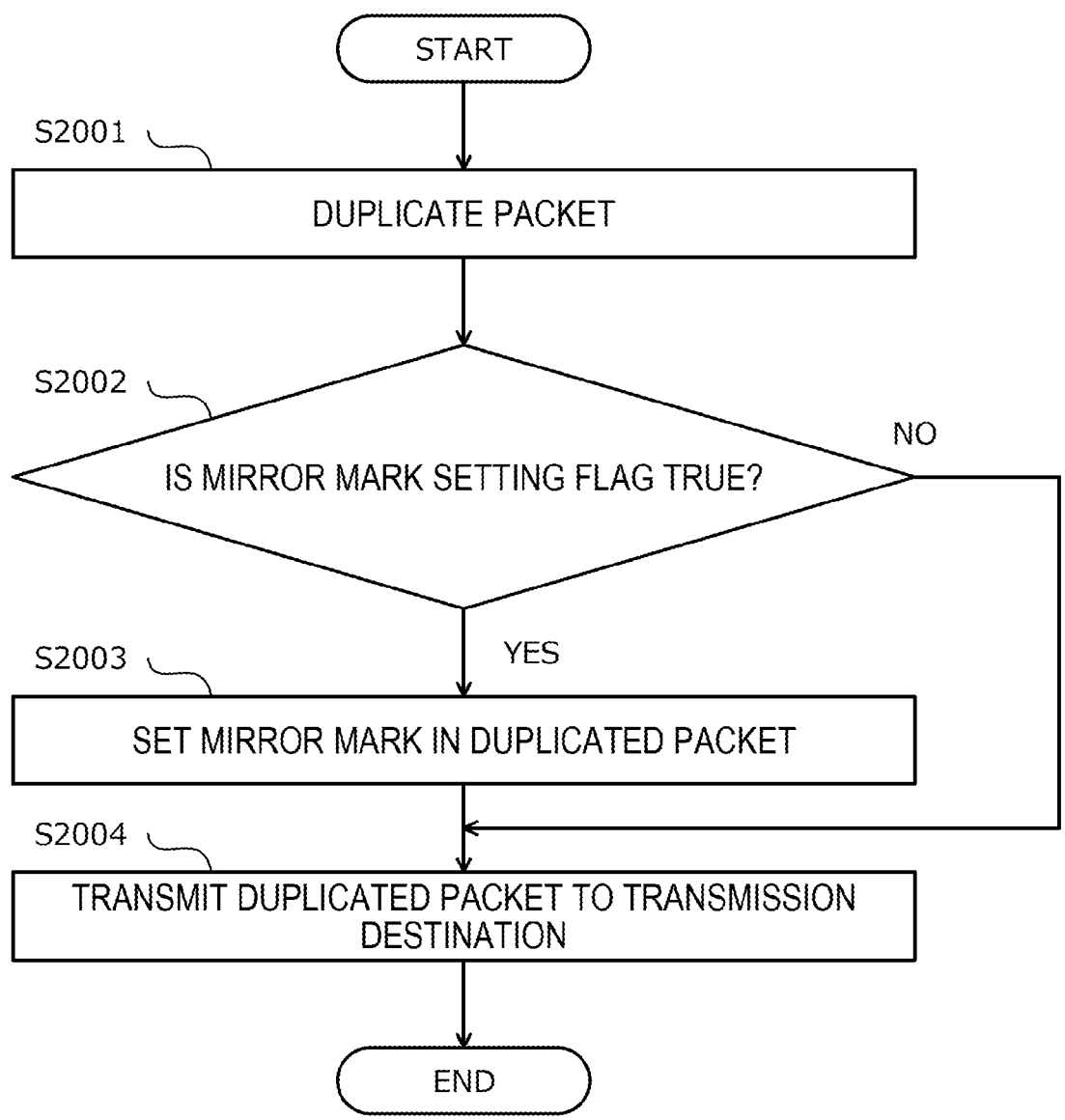
FIG. 20 is a flowchart illustrating an example of a mirror packet transmission procedure.

FIG. 20 is a flowchart illustrating an example of the mirror packet transmission procedure. In FIG. 20, the packet control device 100 duplicates a packet (step S2001).

Next, the packet control device 100 determines whether or not a mirror mark setting flag is True (step S2002). When it is determined that the mirror mark setting flag is True ("Yes" in step S2002), the packet control device 100 proceeds to step S2003. Meanwhile, when it is determined that the mirror mark setting flag is not True ("No" in step S2002), the packet control device 100 proceeds to step S2004.

In step S2003, the packet control device 100 sets a mirror mark in the duplicated packet (step S2003). Then, the packet control device 100 proceeds to step S2004.

In step S2004, the packet control device 100 transmits the duplicated packet to the transfer destination (step S2004). Then, the packet control device 100 ends the mirror packet transmitting process.

Mirror Mark Removal Procedure

Next, an example of the mirror mark removal procedure executed by the packet control device 100 will be described with reference to FIG. 21. The mirror mark removal procedure is implemented by, for example, the CPU 301 illustrated in FIG. 3, a storage area of the memory 302 or the recording medium 305, and the network I/F 303.

Figure 21:
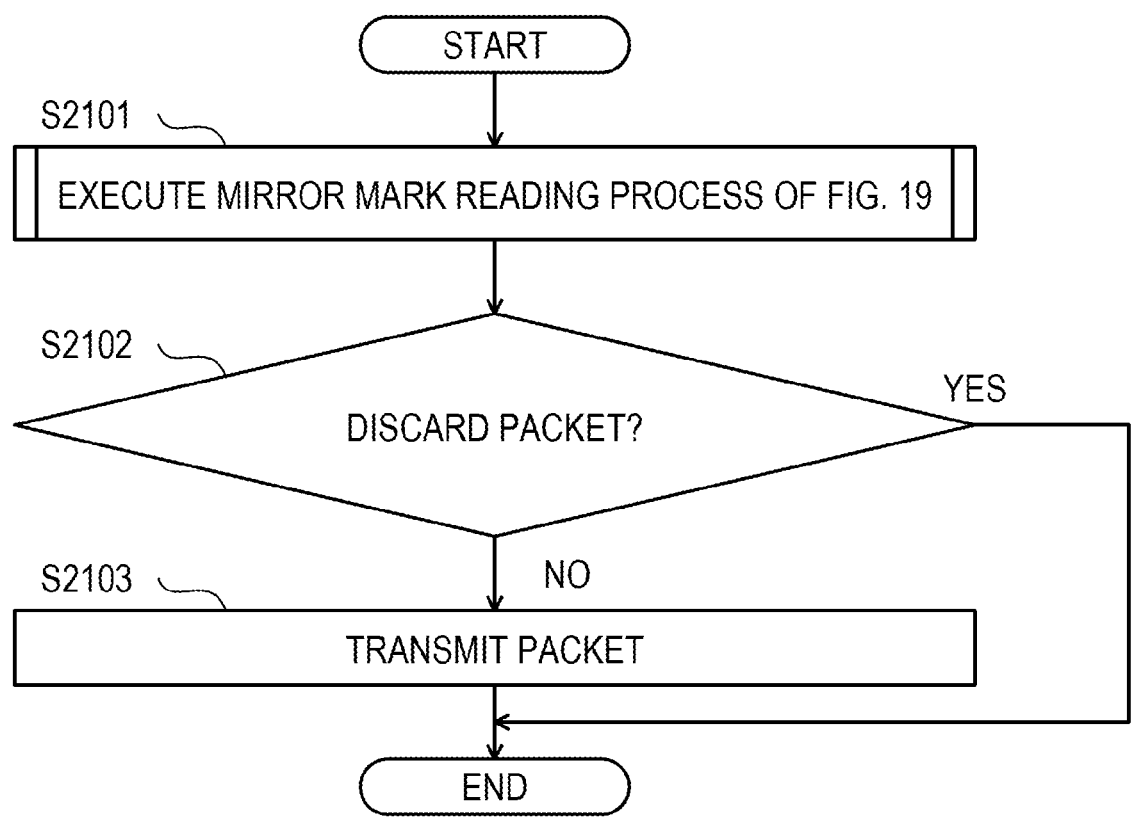
FIG. 21 is a flowchart illustrating an example of a mirror mark removal procedure.

FIG. 21 is a flowchart illustrating an example of the mirror mark removal procedure. In FIG. 21, the packet control device 100 executes the mirror mark reading process of FIG. 19 (step S2101).

Next, the packet control device 100 determines whether or not a packet is a discard packet (step S2102). When it is determined that a packet is a discard packet ("Yes" in step S2102), the packet control device 100 ends the mirror mark removing process. Meanwhile, when it is determined that a packet is not a discard packet ("No" in step S2102), the packet control device 100 proceeds to step S2103.

In step S2103, the packet control device 100 transmits the packet (step S2103). Then, the packet control device 100 ends the mirror mark removing process.

As described above, according to the packet control device 100, it is possible to receive the packet 101 and refer to the first information to determine whether or not the received packet 101 is a mirroring target. According to the packet control device 100, when it is determined that the packet 101 is a mirroring target, it is possible to determine whether or not the packet 101 has been mirrored, based on the value of the predetermined area of the packet 101. According to the packet control device 100, when it is determined that the packet 101 has not been mirrored, it is possible to generate the packet 102 obtained by duplicating the packet 101. According to the packet control device 100, it is possible to set the value of the predetermined area of the packet 102 to a value indicating that mirroring has been completed, transfer the value to the transfer destination, and transmit the packet 101 to the transmission destination. As a result, the packet control device 100 may make it possible to determine that the packet 102 has been mirrored at the transfer destination of the packet 102.

According to the packet control device 100, when it is determined that the packet 101 has been mirrored, it is possible to set the value of the predetermined area of the packet 101 to a value indicating that the packet 101 has not been mirrored, and transmit the value to the transmission destination. As a result, the packet control device 100 may prevent the packets having the same contents from being duplicated and transferred even when receiving the packet 103 having the same content as the packet 101 transferred once.

According to the packet control device 100, it is possible to determine whether or not a packet output to a VM via the same port as the packet 101 is a mirroring target. According to the packet control device 100, when the packet 101 is a mirroring target and a packet to be output to the VM through the same port as the packet 101 is a mirroring target, it is possible to determine whether or not the packet 101 has been mirrored. As a result, the packet control device 100 may prevent the packet of the same contents from continuing to flow in a loop shape without marking a mirror packet, thereby reducing the amount of processing involved in the determination.

According to the packet control device 100, it is possible to refer to the second information to determine whether or not a port through which the packet 101 passes is a port leading to the transfer destination of a mirror packet input through another port. According to the packet control device 100, when the packet 101 is a mirroring target and the port through which the packet 101 passes is a port leading to the transfer destination of the mirror packet input through another port, it is possible to determine whether or not the packet 101 has been mirrored. As a result, the packet control device 100 may prevent the packet of the same contents from continuing to flow in a loop shape without marking a mirror packet, thereby reducing the amount of processing involved in the determination.

According to the packet control device 100, when the checksum calculated by inverting the value of the predetermined area of the packet 101 matches the checksum included in the packet 101, it may be determined that the packet 101 has been mirrored. As a result, the packet control device 100 may assign a mirror mark to the packet 101 so that the packet 101 may be restored regardless of the contents of the packet 101.

According to the packet control device 100, an Ethernet header area may be used in a predetermined area. Further, according to the packet control device 100, an IP header area may be used in a predetermined area. As a result, the packet control device 100 may assign a mirror mark to the packet 101. In addition, the packet control device 100 may use an IP checksum having a relatively small amount of computation when determining whether or not the packet 101 has been mirrored, by using the IP header area in the predetermined area.

According to the packet control device 100, it is possible to determine whether or not the checksum calculated by inverting the value of the first area of the packet 101 matches the first checksum included in the packet 101. According to the packet control device 100, it is possible to determine whether or not the checksum calculated by inverting the value of the second area of the packet 101 matches the second checksum included in the packet 101. According to the packet control device 100, it is possible to determine whether or not the packet 101 has been mirrored, based on the results of the determination. As a result, the packet control device 100 may distinguish between a case where there is an error in either the first area or the second area but no mirror mark is provided and a case where a mirror mark is provided.

The packet control method described in the present embodiment may be implemented by executing a prepared program on a computer such as a personal computer or a workstation. The mirror packet control program described in the present embodiment is recorded in a computer-readable recording medium such as a hard disk, a flexible disk, a CD-ROM, an MO, or a DVD, and is executed by being read out from the recording medium by the computer. Further, the mirror packet control program described in the present embodiment may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   receiving a first packet to be input or output through a first port which is any of plural ports;
   referring to first information to determine whether the first packet is to be mirrored, the first information indicating whether a packet input or output through each of the plural ports is to be mirrored;
   determining, when it is determined that the first packet is to be mirrored, whether the first packet has been mirrored, based on a value of a first predetermined area of the first packet;
   when it is determined that the first packet has not been mirrored, generating a second packet by duplicating the first packet, setting a first value to the first predetermined area of the second packet, the first value indicating that the second packet has been mirrored, transferring the second packet to a transfer destination and transmitting the first packet to a transmission destination; and
   when it is determined that the first packet has been mirrored, setting a second value to the first predetermined area of the first packet, the second value indicating that the first packet has not been mirrored and transmitting the first packet having the second value in the first predetermined area to the transmission destination.

2. The non-transitory computer-readable recording medium according to claim 1, the process further comprising:
   determining whether a third packet to be output through the first port is to be mirrored; and
   determining whether the first packet has been mirrored when it is determined that the first packet is to be mirrored and when it is determined that the third packet is to be mirrored.

3. The non-transitory computer-readable recording medium according to claim 1, the process further comprising:
   referring to second information to determine whether the first port is a mirror port leading to a transfer destination of a mirror packet input through another port, the second information indicating whether each of the plural ports is a mirror port; and
   determining whether the first packet has been mirrored, when it is determined that the first packet is to be mirrored and when it is determined that the first port is a mirror port.

4. The non-transitory computer-readable recording medium according to claim 1, the process further comprising:
   determining that the first packet has been mirrored when a checksum calculated by inverting the value of the first predetermined area of the first packet matches a checksum included in the first packet.

5. The non-transitory computer-readable recording medium according to claim 1, the process further comprising:
  determining whether the first packet has been mirrored based on a result of first determination and a result of second determination, the first determination being as to whether a checksum calculated by inverting the value of the first predetermined area of the first packet matches a first checksum included in the first packet, the second determination being as to whether a checksum calculated by inverting a value of a second predetermined area of the first packet matches a second checksum included in the first packet.

6. The non-transitory computer-readable recording medium according to claim 1, wherein the first predetermined area is included in an Ethernet header area.

7. The non-transitory computer-readable recording medium according to claim 1, wherein the first predetermined area is included in an internet protocol (IP) header area.

8. A packet control method comprising:
  receiving, by a computer, a first packet to be input or output through a first port which is any of plural ports;
  referring to first information to determine whether the first packet is to be mirrored, the first information indicating whether a packet input or output through each of the plural ports is to be mirrored;
  determining, when it is determined that the first packet is to be mirrored, whether the first packet has been mirrored, based on a value of a first predetermined area of the first packet;
  when it is determined that the first packet has not been mirrored, generating a second packet by duplicating the first packet, setting a first value to the first predetermined area of the second packet, the first value indicating that the second packet has been mirrored, transferring the second packet to a transfer destination and transmitting the first packet to a transmission destination; and
  when it is determined that the first packet has been mirrored, setting a second value to the first predetermined area of the first packet, the second value indicating that the first packet has not been mirrored and transmitting the first packet having the second value in the first predetermined area to the transmission destination.

9. A packet control device comprising:
  a memory; and
  a processor coupled to the memory and the processor configured to:
  receive a first packet to be input or output through a first port which is any of plural ports;
  refer to first information to determine whether the first packet is to be mirrored, the first information indicating whether a packet input or output through each of the plural ports is to be mirrored;
  determine, when it is determined that the first packet is to be mirrored, whether the first packet has been mirrored, based on a value of a first predetermined area of the first packet;
  when it is determined that the first packet has not been mirrored, generate a second packet by duplicating the first packet, set a first value to the first predetermined area of the second packet, the first value indicating that the second packet has been mirrored, transfer the second packet to a transfer destination, and transmit the first packet to a transmission destination; and
  when it is determined that the first packet has been mirrored, set a second value to the first predetermined area of the first packet, the second value indicating that the first packet has not been mirrored and transmit the first packet having the second value in the first predetermined area to the transmission destination.

* * * * *